United States Patent [19]

Tsukamoto et al.

[11] Patent Number: 5,128,981
[45] Date of Patent: Jul. 7, 1992

[54] RADIO COMMUNICATION SYSTEM AND A PORTABLE WIRELESS TERMINAL

[75] Inventors: Nobuo Tsukamoto, Tachikawa; Hiroshi Kuwahara, Kodaira; Yuji Sakamoto, Kokubunji; Kumiko Takikawa, Tama, all of Japan

[73] Assignee: Hitachi, Ltd., Tokyo, Japan

[21] Appl. No.: 526,246

[22] Filed: May 21, 1990

[30] Foreign Application Priority Data

May 24, 1989 [JP] Japan .................................. 1-128824
May 26, 1989 [JP] Japan .................................. 1-131352

[51] Int. Cl.⁵ ............................................ H04M 11/00
[52] U.S. Cl. ................................. 379/58; 379/59; 379/60; 379/61; 379/63
[58] Field of Search ............... 370/62, 108, 110.1; 379/56, 57, 58, 59, 60, 61, 62, 63, 112; 455/33

[56] References Cited

U.S. PATENT DOCUMENTS

| | | | |
|---|---|---|---|
| 4,312,074 | 1/1982 | Pautler et al. | 375/96 |
| 4,456,793 | 6/1984 | Baker et al. | 379/56 |
| 4,481,382 | 11/1984 | Villa-Real | 379/61 |
| 4,661,659 | 4/1987 | Nishimura | 379/61 |
| 4,771,448 | 9/1988 | Koohgoli et al. | 379/60 |
| 4,843,622 | 6/1989 | Yotsutani et al. | 379/59 |
| 4,852,148 | 7/1989 | Shibata et al. | 379/59 |
| 4,914,686 | 4/1990 | Hagar, III et al. | 379/61 |
| 4,972,457 | 11/1990 | O'Sullivan | 379/59 |
| 4,980,907 | 12/1990 | Raith et al. | 379/63 |

FOREIGN PATENT DOCUMENTS

| | | | |
|---|---|---|---|
| 0344989 | 12/1989 | European Pat. Off. | 379/59 |
| 62-143171 | 6/1987 | Japan . | |
| 0001226 | 3/1989 | Japan | 379/59 |
| 86/00775 | 1/1986 | World Int. Prop. O. | 379/60 |

OTHER PUBLICATIONS

Akio Sasaki et al., "System Configuration of Multi-Zone Cordless Telephone", NIT Electrical Communications Laboratories, The Institute of Electronics and Communication Engineers of Japan 1986 All Japan Meeting, No. 438, pp. 2-256. Provided in Japanese. An English translation is unavailable to applicants' attorney.

Cardona, Heim and Turriere "Digital Data Transmission System for Fixed and Mobile Subscribers", Electrical Communication vol. 52, #3, 1977.

Primary Examiner—James L. Dwyer
Assistant Examiner—William Cumming
Attorney, Agent, or Firm—Fay, Sharpe, Beall, Fagan, Minnich & McKee

[57] ABSTRACT

This invention proposes a radio communication system including a plurality of radio terminals, a relay apparatus (including a plurality of base stations and an exchange station) connected to each radio terminal so that the radio terminals can interchange information from each other, and a data processing unit connected to the relay apparatus, each radio terminal having a circuit for inputting and outputting a voice signal and a circuit for inputting and outputting data whereby it can communicate with another radio terminals or with the data processing unit through the relay apparatus. The radio terminal of this invention further has a clock, and a circuit for storing a schedule inputted by the user thereby to automatically select a receiving mode such as a ringing mode or a nonringing mode in accordance with the contents of the schedule, the present time and so on.

16 Claims, 20 Drawing Sheets

FIG. 6

THE DAY FOR A MEETING ?

1989 / 5 / 24 ~ 1989 / 5 / 26  [EXECUTE]

THE SCHEDULING NAME FOR THE MEETING ?

o o o   [EXECUTE]

PURPOSE ?

x x x   [EXECUTE]

PLACE ?                    (NOTE) — INDICATES OPERATE INPUT KEY

△ △ △   [EXECUTE]

ATTENDANCE          THE GRADE OF IMPORTANCE ?

A   III   [EXECUTE]
B   II    [EXECUTE]
    ⋮
[EXECUTE]

LIQUID CRYSTAL DISPLAY

```
<PREPARING A DRAFT OF SCHEDULE>
PERIOD              1989/5/24 ~ 1989/5/26
THE SCHEDULING NAME
PURPOSE :
PLACE   :
ATTENDANCE AND THE GRADE OF IMPORTANCE
```

| NAME | THE GRADE OF IMPORTANCE | NAME | THE GRADE OF IMPORTANCE |
|------|------------------------|------|------------------------|
| A    | III                    | E    | II                     |
| B    | II                     | F    | III                    |
| C    | I                      | .    | .                      |
| D    | II                     | .    | .                      |

DO YOU SEND THIS SCHEDULE ?   Y / N

LIQUID CRYSTAL DISPLAY

FIG. 9

```
THE DAY FOR
A MEETING       : 1989 / 5 / 24
TIME            : 14:00 ~ 16:00
THE SCHEDULING NAME : o o o
PURPOSE         : x x x
PLACE           : △ △ △
ATTENDANCES :
```

| NAME | NAME | NAME |
|------|------|------|
| A    | D    |      |
| B    | E    |      |
| C    | F    |      |

PRESENT OR ABSENT ? : Y

— INDICATES "OPERATE INPUT KEY"   LIQUID CRYSTAL DISPLAY

FIG. 10

THE DAY OF SCHEDULE FOR DISPLAYING ?

1989 / 5 / 26            EXECUTE

— INDICATES "OPERATE INPUT KEY"   LIQUID CRYSTAL DISPLAY

FIG. 11

| 1989/5/26 | | | | | |
|---|---|---|---|---|---|
| TIME | THE SCHEDULING NAME | TRANSMITTER | THE GRADE OF IMPORTANCE | PRESENT OR ABSENCE | |
| 9:00~12:00 | × × × | X | III | Y | 11a |
| 10:00~11:00 | △ △ △ | Y | II | N | 11b |
| 10:30~12:00 | ▽ ▽ ▽ | Z | I | N | 11c |
| 16:00~18:00 | ○ ○ ○ | P | II |  | 11d |
| 18:00~19:00 | □ □ □ | Q | I |  | 11e |

LIQUID CRYSTAL DISPLAY

FIG. 12

| FIXING OF SCHEDULE | | |
|---|---|---|
| THE SCHEDULING NAME | DATE OF MEETING | TIME |
| △ △ △ | 1989/5/24 | 12:00   14:00 |
| × × × | 1989/5/26 | 9:00   10:00 |
| ▽ ▽ ▽ | 1989/5/26 | 15:00   17:00 |

LIQUID CRYSTAL DISPLAY

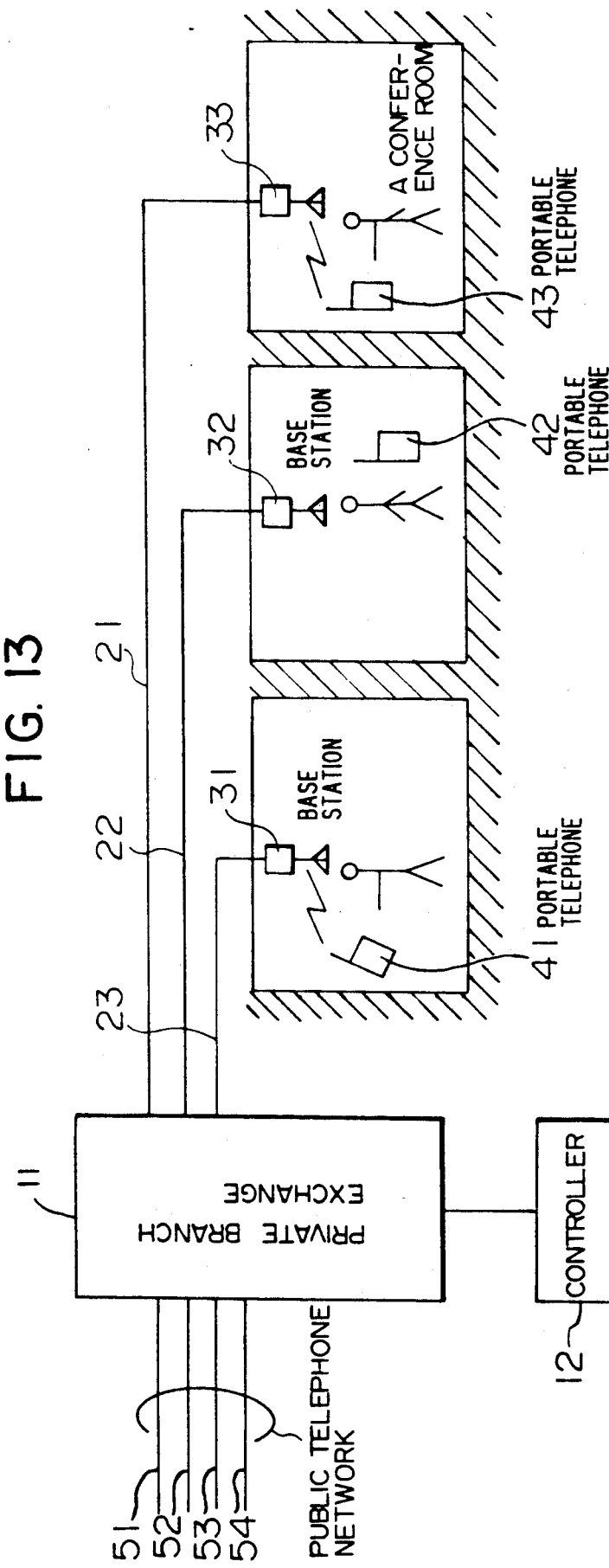
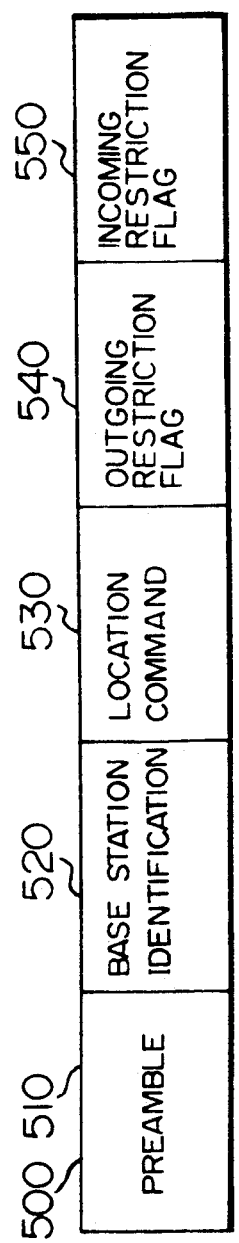

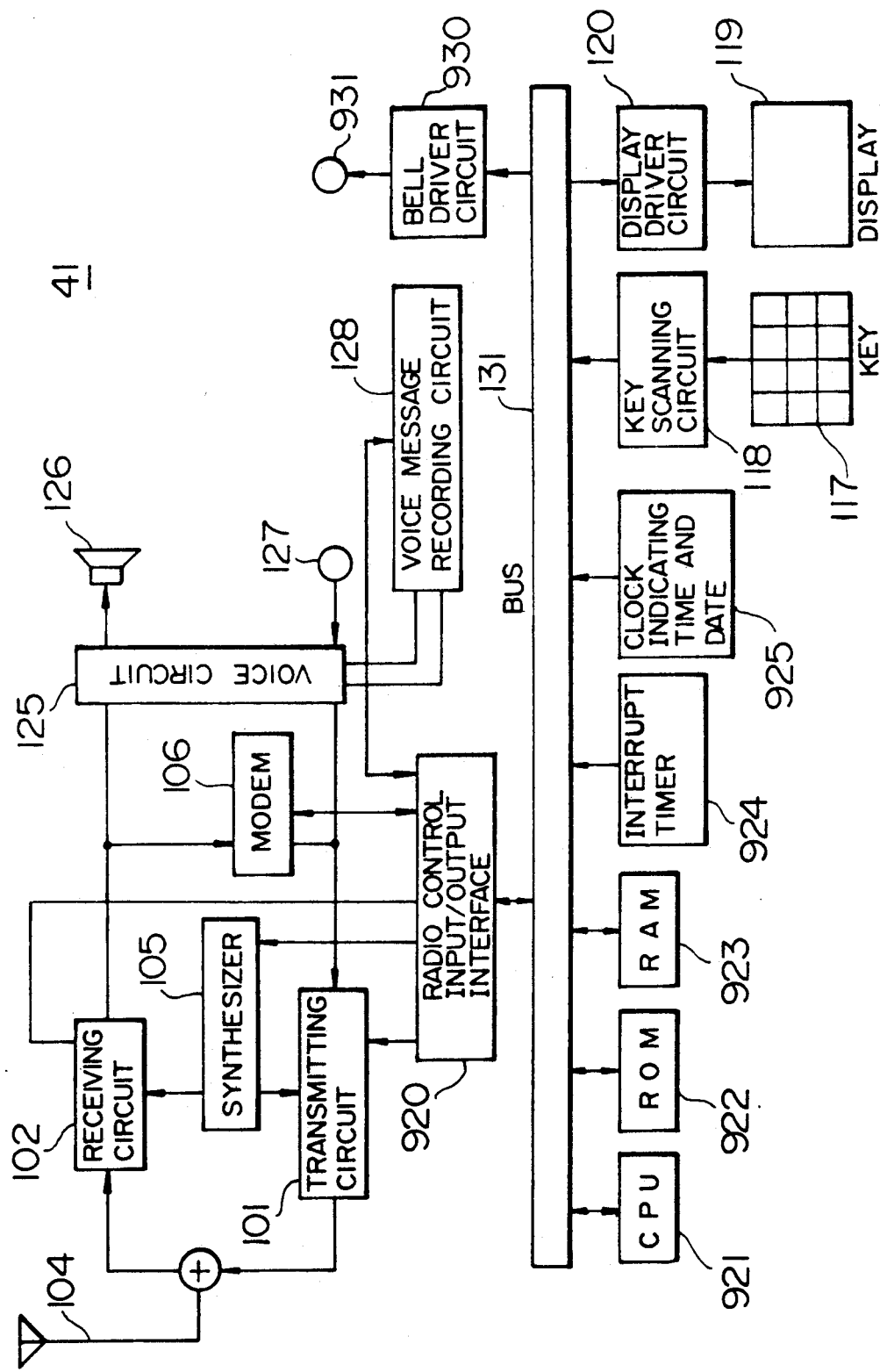

FIG. 19

| START TIME | END TIME | CONTENT | PLACE | INCOMING RESTRICTION LEVEL | OUTGOING RESTRICTION LEVEL | LOCATION CALLING |
|---|---|---|---|---|---|---|
| 10:00 | 12:00 | PREVIOUS ARRANGEMENT | FIRST CONFERENCE ROOM | NON RINGING | NON VOICE COMMUNICATION | ON |
| ------ | ----- | ----- | ----- | ----- | ----- | ----- |

FIG. 20

| | COMMUNICATION WITH RINGING | COMMUNICATION WITH NON-RINGING |
|---|---|---|
| VOICE FREQUENCY COMMUNICATION | TALKING | VOICE MESSAGE |
| NON VOICE FREQUENCY COMMUNICATION | ELECTRIC MAIL WITH RINGING | ELECTRIC MAIL |

FIG. 21

| RECEIVING PROHIBITION FLAG | RINGING PROHIBITION FLAG | VOICE COMMUNICATION PROHIBITION FLAG |
|---|---|---|
| 91 | 92 | 93 |

FIG. 22

| CALL RESTRICTION BY SCHEDULING | CALL RESTRICTION BY LOCATION | OPERATION |
|---|---|---|
| NO | YES | RESTRICTION BY LOCATION |
| YES | NO | RESTRICTION BY SCHEDULE |
| YES | YES | RESTRICTION BY SCHEDULE |

RADIO COMMUNICATION SYSTEM AND A PORTABLE WIRELESS TERMINAL

BACKGROUND OF THE INVENTION

This invention relates to personal portable wireless terminals (hereinafter, referred to as portable terminals) and radio communication systems and particularly to a portable terminal having functions of telephone, scheduling manager and address book manager or a plurality of receiving modes and to a radio communication system using this portable terminal.

A small size portable computer (or electric note book), having the function of scheduling manager, is known as an electronic scheduler and disclosed in, for example, JP-A-143171/1987. This electronic scheduler has the function that the private schedules inputted by its owner, operator or user are stored as data and that later, a key work such as date or matter (event) is used to search the corresponding data of the schedules, then the data is displayed. There is another small size portable computer (electric note book) which has, in addition to the schedule managing function mentioned above, the function that desired data such as telephone numbers, an address book and so on are previously stored and are, if necessary, read by use of various kinds of key words and displayed. It has a pocket size shape and thus it is becoming a necessary article for the businessmen in place of the usual note book.

The indoor or limited area radio telephone system to which the conventional cordless telephone has developed is described in the paper, No. 438, page 2-256 (1986) of the 1986-all-Japan meeting of the Institute of Electronics and Communication Engineers of Japan, section of communication. This system solved the problem that cordless telephones are limited only to the use in a narrow range because they are connected to a particular base station, or it has the feature that the cordless telephones can be connected to unspecified base stations under the control of PBX (private branch exchange) so that the user can call a telephone at any place within the yard. If each person always carries his own small size wireless telephone of this type, each person at a given place can freely call other persons or can be freely called by other persons. Thus, it is possible to call any person by use of a particular wire telephone installed at a particular place and directly call a particular person by use of a wireless telephone.

The conventional small size portable computer (or electric note book) mentioned above, however, stores only private schedules or the like, and thus has a limited advantage.

We will now consider, for example, the function of a scheduler. When we try to make previous arrangements or call a conference, we first check the schedules of persons who are to attend, select the dates on which the attendants are free, and then fix appointments with the attendants, before making the schedule for the meeting. In addition, we send invitation notes in which the contents of the schedule are written, to the persons to attend, and record the contents of the schedule on our note or the like. Thus, the conventional electric note book which stores only the private schedules is not useful when we make a schedule for a conference. That is, we must be helped by another in collecting the schedules of the persons to attend, adjusting and fixing the date of the conference and sending the invitation note to the respective attendants, which operations take much time and labor. In other words, the conventional electric note book has the function of storing the result of having fixed a schedule, or the function of the usual note book, and does not utilize the data stored in the electric note books of other persons'.

We will next consider the memo function. The telephone numbers, an address book and so on must be inputted by manually, which operation is troublesome. Moreover, precious data stored with much labor may be lost by erroneous operation (for example, resetting) of the electric note book. The loss of such information may bring the businessman into a serious situation.

Also, in the indoor radio telephone system mentioned above, when an owner of a radio telephone is directly called by another radio telephone, calling and being called occur at arbitrary places within the yard, for example, at a place where a meeting is being conducted, under which situation the ringing from the telephone may disturb the meeting. In this case, most telephone calls will probably need no emergency, and thus a speech or voice message (for example, automatic answering telephone) will satisfy such communication as the telephone call. The speech or voice communication may be unnecessary depending on the contents, but may often be replaced by a memo in which case the electric mail or the like may be used. In addition to the present speech communication accompanied with ringing, this nonringing communication can be introduced to enable the choise of a communication mode matched with time, place and situation, thus reducing useless calls.

A method of switching among the communication modes and control of the forbidden level depending on the contents of a meeting is necessary. At each time of movement to a certain place, these must be changed by key input with match labor and time taken, which fact may cause the user to forget the switching of communication modes.

SUMMARY OF THE INVENTION

It is an object of the invention to provide a radio communication system which enables a plurality of portable terminals to use the information within each terminal.

It is another object of the invention to provide portable terminals which automatically switch the receiving modes and a radio communication system using those portable terminals.

In order to achieve one of the above objects, the radio communication system of the invention comprises a plurality of portable terminals, relay means for communicating with the respective portable terminals, and a data processing unit connected to the relay means, each portable terminal having voice input/output means and data input/output means and which can communicate with other portable terminals or the data processing unit through the relay means.

Specifically, the portable terminal has a memory for storing the data inputted through data input means, and another memory for monitoring the data change within the first-mentioned memory, reading the changed data and storing it, the changed data being automatically transmitted to the data processing unit.

Also, the data processing unit, at each certain period, requests each portable terminal to send data within the memory, controls storage means to store the received data from each portable terminal, and transmits necessary data to a portable terminal in accordance with the request from the portable terminal The portable terminal may transmit information including the data and pass word previously inputted through the data input/output means to the data processing unit, while the data processing unit may store the transmitted information in storage means, and transmit the data only when a request including a predetermined pass word is sent from the portable terminal.

Also, the data processing unit stores received data from each portable terminal in the memory, processes the data stored in the memory in accordance with the request from the terminal, and transmits the processed result to each specified terminal.

The owner of each portable terminal having the above-mentioned function can make telephone communication with a person having another portable terminal and make data communication with the data processing unit. Also, since each portable terminal causes the data processing unit to automatically store the inputted and stored data (for example, each time the data in the memory within the terminal changes) or store the data in a certain period (for example, such as midnight), the owner of each terminal is not required to send the data by his manual operation, but the data from each portable terminal can be transmitted to the data processing unit.

Moreover, since the data processing unit functions as the backup unit for each terminal, missing a portable terminal from its owner, for example, will result in no trouble because necessary data can be read by another portable terminal.

In addition, when data is registered in the data processing unit, a pass word is attached to the data, so that the data processing unit can respond to the request for reading data, from a portable terminal only when the specified data includes that pass word. Therefore, the data reading can be prevented from being made by a malicious third party.

Also, the data processing unit controls the memory to store the received data from each portable terminal, processes the data in the storage means in accordance with the demand from a certain portable terminal (for example, a request for fixing a meeting as will be described with reference to FIG. 6 and the following), and transmits the result of the processing (for example, a notice of opening the meeting) to specified portable terminals, thus the data inputted in each portable terminal is used by each other.

In order to achieve the other object, according to this invention, each portable terminal is constructed to have clock means, means for setting schedules, and means for switching the receiving modes so that a receiving mode can be automatically selected in accordance with the contents of a fixed schedule and the present time.

The contents of the fixed schedule includes, for example, the time when a conference is started, the time when it is concluded, the conference room (place), the incoming restriction level for controlling the transmission mode, the outgoing restriction level for controlling the receiving modes, and so on.

In order to regulate free calls from other subscribers, a radio bases station which covers a special area such as a conference room in which the incoming and outgoing calls must be regulated, broadcasts the signal for identifying the base station (hereinafter, referred to as the base station ID) and flags (outgoing call control flag and incoming call control flag) indicating the previously set incoming restriction level and outgoing restriction level. Each portable terminal selects a receiving mode according to the contents of the fixed schedule and the contents of the signal from the base station.

In this case, the portable terminal recognizes its present location from the base station ID broadcasted from the base station and the base station ID vs. location table previously stored in the internal memory, and selects either the receiving mode determined by the schedule or the receiving mode determined on the information from the base station in accordance with the present location.

When the present location is different from the location set in the schedule, the portable terminal produces an alarm, or when receiving an emergency signal from the base station, the portable terminal selects a predetermined receiving mode in place of the receiving mode selected as described above.

The portable terminal of the invention automatically selects a receiving mode in accordance with the present time and the contents of the schedule, and thus does not need a complicated switching operation for switching receiving modes.

Moreover, since the contents of the fixed schedule includes, for example, the time when a conference is started, the incoming restriction levels for regulating the receiving modes, unnecessary calls during the conference can be limited.

When the present location is different from the location set in the schedule at the present time, the portable terminal produces an alarm, and thus it is useful for its owner to make schedule control. If the owner has forgotten a meeting which he is to attend, the alarm from the portable terminal informs him of the meeting.

The foregoing and other objects, advantages, manner of operation and novel features of the present invention will be understood from the following detailed description when read in connection with the accompanying drawings.

BRIEF DESCRIPTION OF THE DRAWINGS

FIG. 6 is a diagram useful for explaining the input procedure for preparing a draft of the group scheduling;

FIG. 9 shows an example of the notice of a conference;

FIG. 10 is a diagram useful for explaining the procedure for specifying the date of a schedule to be displayed;

FIG. 11 shows an example of the displayed schedule at the date specified in FIG. 10;

FIG. 12 shows an example of the display of fixed schedules;

FIG. 13 is a block diagram of a second radio communication system according to this invention;

FIG. 14 shows the format of a location information signal broadcast from the radio base station;

FIG. 15 is a block diagram of a second portable terminal of the invention;

FIG. 19 is a diagram useful for explaining an example of the input of schedules;

FIG. 20 shows the relation between the communication restriction and the communication modes;

FIG. 21 shows the communication of restriction flag storage area;

FIG. 22 shows the relation between the restriction by scheduling and the restriction by location;

DESCRIPTION OF THE PREFERRED EMBODIMENTS

Figure 1:
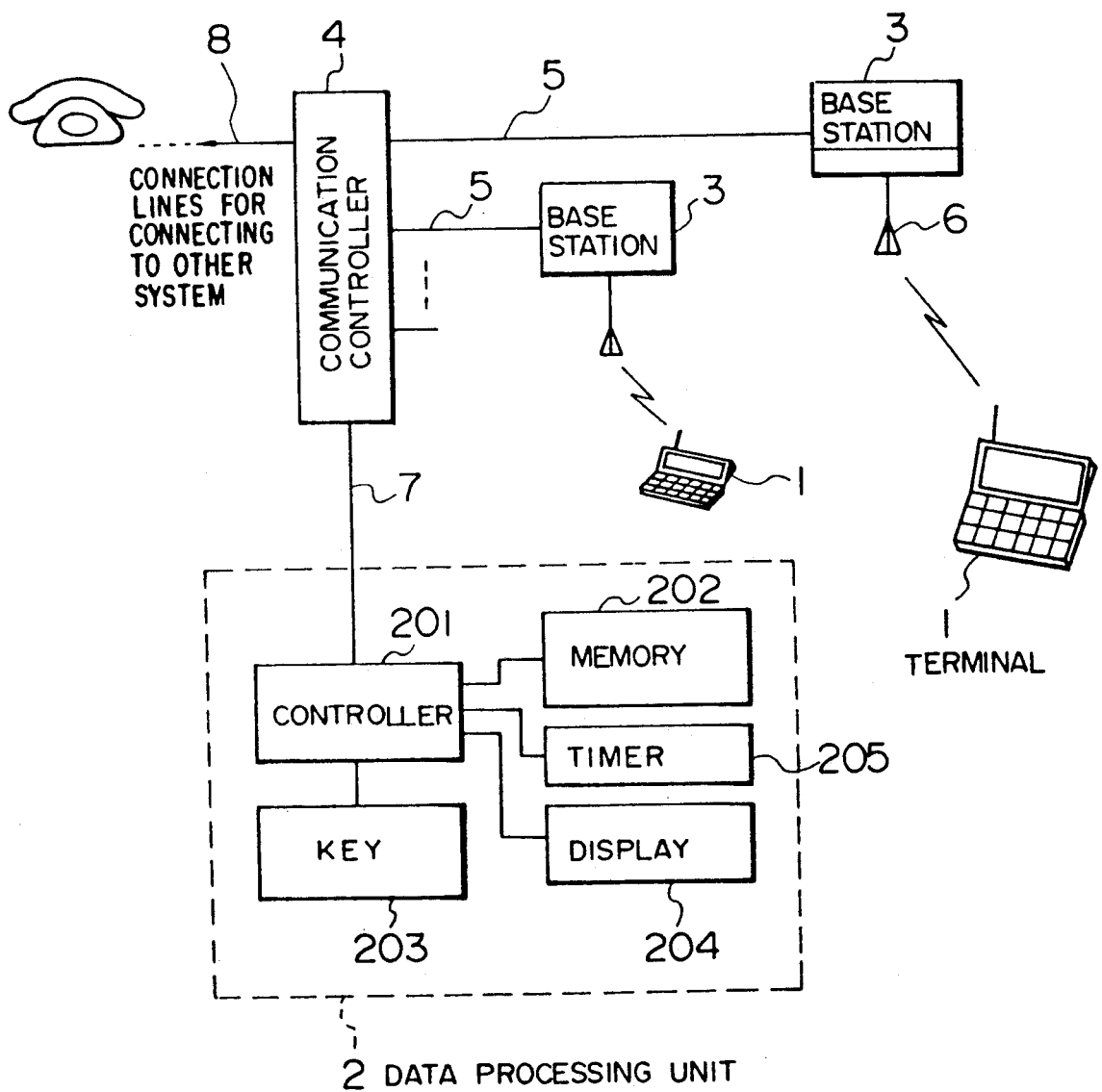
FIG. 1 is a block diagram of a first radio communication system according to this invention.

An embodiment of the invention will be described with reference to a system which is assumed to be installed in an indoor office environment. FIG. 1 is a block diagram of a first radio communication system of this invention. In FIG. 1, there are shown portable wireless terminals 1 (hereinafter, referred to simply as the terminals) each having a radio transceiver function and which can be carried within the office. The internal details of this terminal will be mentioned later with reference to FIG. 2. Shown at 2 is a data processing unit for controlling the whole system, and at 3 are base stations which are coupled by a radio wave to the terminals 1 and which are provided on, for example, the walls or ceilings of the office. The places in which the base stations are installed, and the number of the base stations are determined by the space of the office and the distance which the radio wave can reach, in order that the terminals are able to communicate with any one of the base stations whenever the terminals are located at any positions within the service area of the office. Shown at 4 is a communication controller for controlling communication channels to be set or opened between the data processing unit and the base stations. When the terminals are used as telephones, the communication controller 4 functions as a private branch exchange. Shown at 6 are transmit-receive antennas of the base stations, for example, whip antennas. Shown at 7 is a connection line (interface) for use in exchanging data between the communication controller 4 and the data processing unit 2. For example, an RC-232C interface is used therefor. Shown at 8 are connection lines for connecting the communication controller to other systems. The connection lines 8 are directly connected to the public telephone network. Thus, the system of this invention can be connected through the public telephone network to a system installed in a remote office. When the terminals are used as telephones, the connection lines 8 are used as normal connection lines to the public telephone network. The number of circuits, or channels is set within the range of, for example, several to several tens matched to the amount of traffic.

Figure 2:
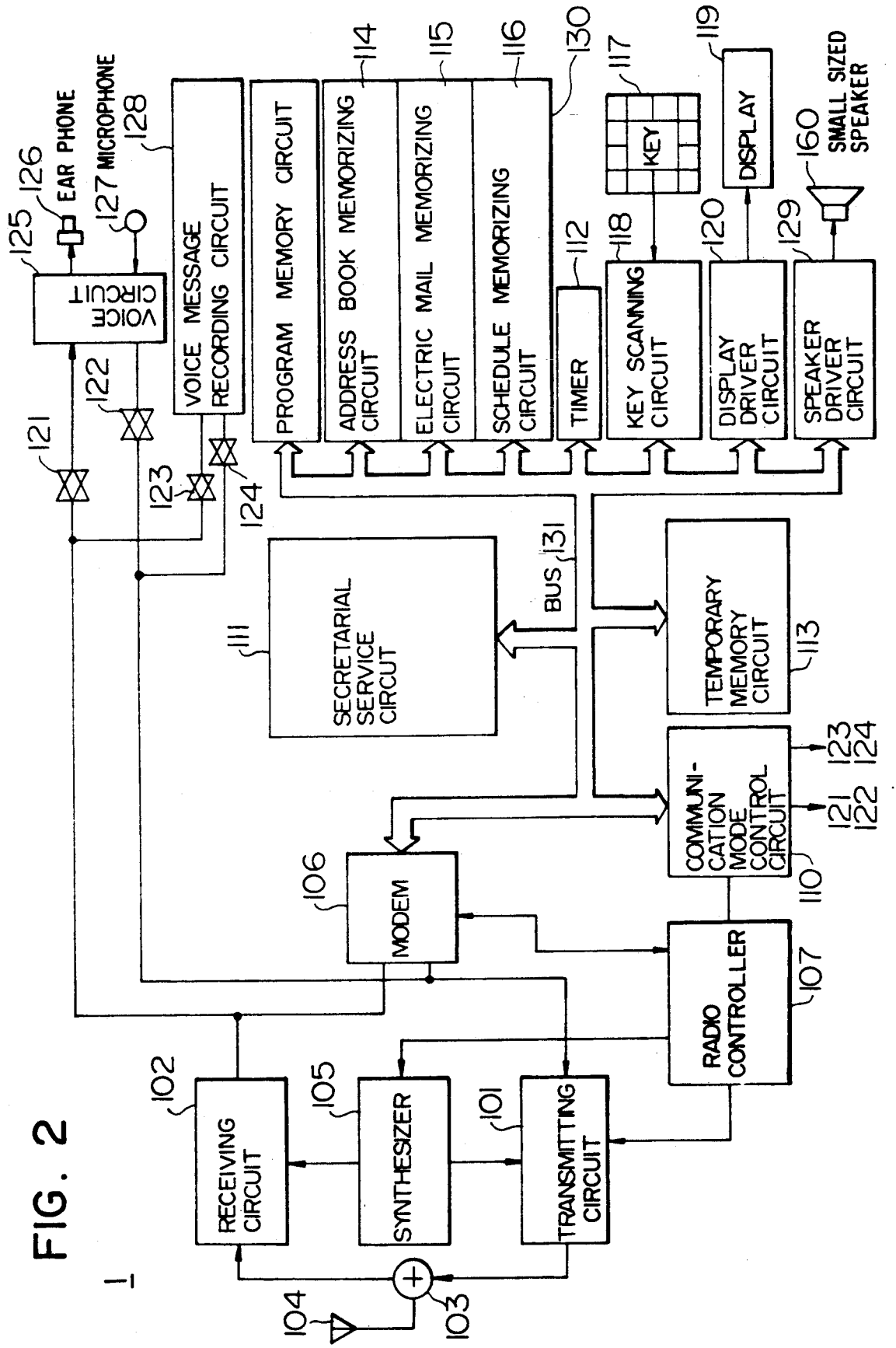
FIG. 2 is a block diagram of a first portable terminal.

FIG. 2 is a block diagram of the terminal 1 shown in FIG. 1. In FIG. 2, there is shown a transmitting circuit 101, in which a carrier signal (of a frequency of, for example, 240 MHz band) from a synthesizer 105 is frequency-modulated by an analog signal (of, for example, 0.3 to 3.4 KHz) from a modem 106 or a voice circuit 125, and the modulated signal is amplified to a predetermined power (for example, 10 mW) and transmitted. The transmitting circuit 101 has in its output section a switch (not shown) which is operated by a carrier ON/OFF signal from a radio controller 107 so that unnecessary radio waves are not produced in the standby mode. Shown at 102 is a receiving circuit which amplifies a weak signal of a receive frequency band (for example, 380 MHz band), and demodulates the FM signal into an analog signal, or the transmitted information. Shown at 103 is a branching filter for enabling an antenna to be used for both transmitting and receiving. Shown at 104 is a whip or built-in antenna. The frequency synthesizer 105 is ordered by the radio controller 107, to determine transmission and reception frequencies, or transmission and reception channels, and to supply local oscillation frequencies to the transmitting circuit 101 and to the receiving circuit 102. The modem 106 is ordered by the radio controller 107, to modulate digital data (for example, 1, 0, 1, 1, ...) being transmitted, into, for example, a sine wave of 1200 Hz (for example, MSK, or minimum shift keying modulation) and to demodulate the received modulated wave into the original digital information. The radio controller 107 controls channel setting and opening procedure, exchange of digital information with the base station, specifying channels (controlling the synthesizer 105 to specify a frequency), and on/off of the carrier. Shown at 110 is a communication mode control circuit which controls the switching of telephone/voice message/secretarial service function. Shown at 111 is a secretarial service function control circuit which comprises a microcomputer and a program memory. Shown at 112 is a timer which indicates the present year, month, day, hour, minute, and second. Shown at 113 is a temporary memory for information being transmitted. This memory is used for temporarily storing the data of another memory existing within the terminal when it is transmitted to the data processing unit. Further details will be described later, together with the basic operation of this system. Shown at 114 is an address book memorizing circuit, and at 115 is an electric mail memorizing circuit which stores letter information transmitted by communication channel. Shown at 116 is a schedule memorizing circuit, which has a function for storing the schedule of the user of the terminal and part of the schedules of the subscribers of the system a will be described later in the application of this embodiment. Shown at 117 is a key input section, at 118 is a key input circuit, and 119 is a display which is, for example, a liquid crystal indication type for small size and low power consumption.

The display 119 is driven by a display driver 120.

Shown at 121 to 124 are analog switches for preventing the speaker from emanating unnecessary sound and the microphone from picking up undesired signals except when the terminal is used as a telephone. These switches are controlled by the communication mode control circuit 110. Shown at 125 is a voice circuit which is of the same construction as within the normal telephone set. Shown at 126 is the speaker (or earphone), and at 127 is the microphone. Shown at 128 is a voice message recording circuit which includes, for example, a small-sized tape recorder or an analog/digital converter and a semiconductor memory.

Figure 3:
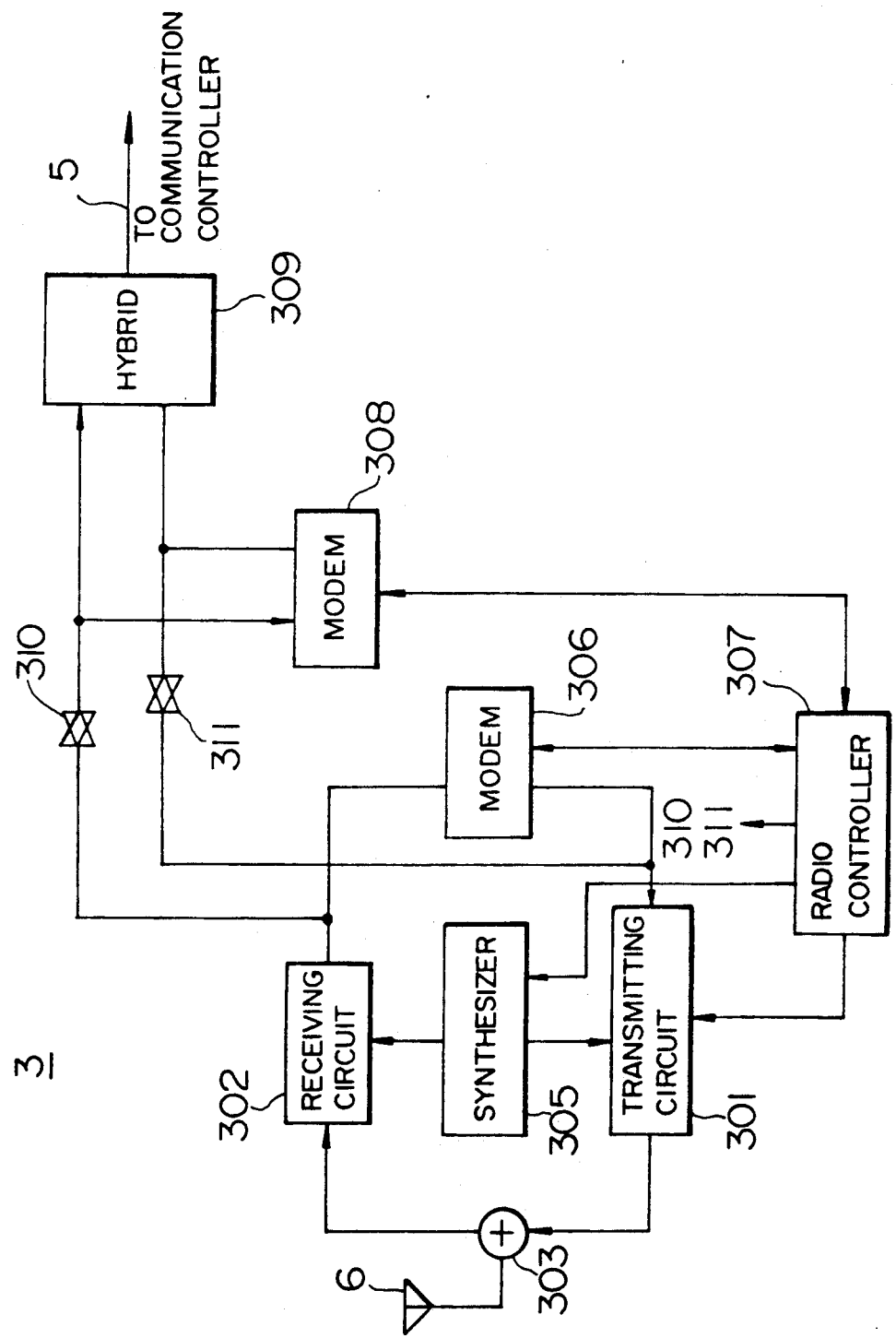
FIG. 3 is a block diagram of the base station.

FIG. 3 is a block diagram of the base station 3 shown in FIG. 1. In FIG. 3, there are shown a transmitting circuit 301, a receiving circuit 302, a branching filter 303, an antenna 6, a synthesizer 305, a modem 306, and a radio circuit controller 307, which have the same functions as the circuits 101 to 107 included in the terminal 2 mentioned with reference to FIG. 2 and thus will not be described. The modem 308 has the function of modulating a signal which is produced from the radio circuit controller 307 and which orders to set and open the channel to the communication controller 4, into digital information and has the function of demodulating the digital signal incoming from the communication controller 4 into information of channel setting and opening, ID number of the terminal to be called, and so on. After the channel is set, the signal from the terminal 1 to the communication controller 4 is transmitted through the transmitting and receiving circuits 301 and 302 of the base station and directly through a hybrid 309.

Figure 4:
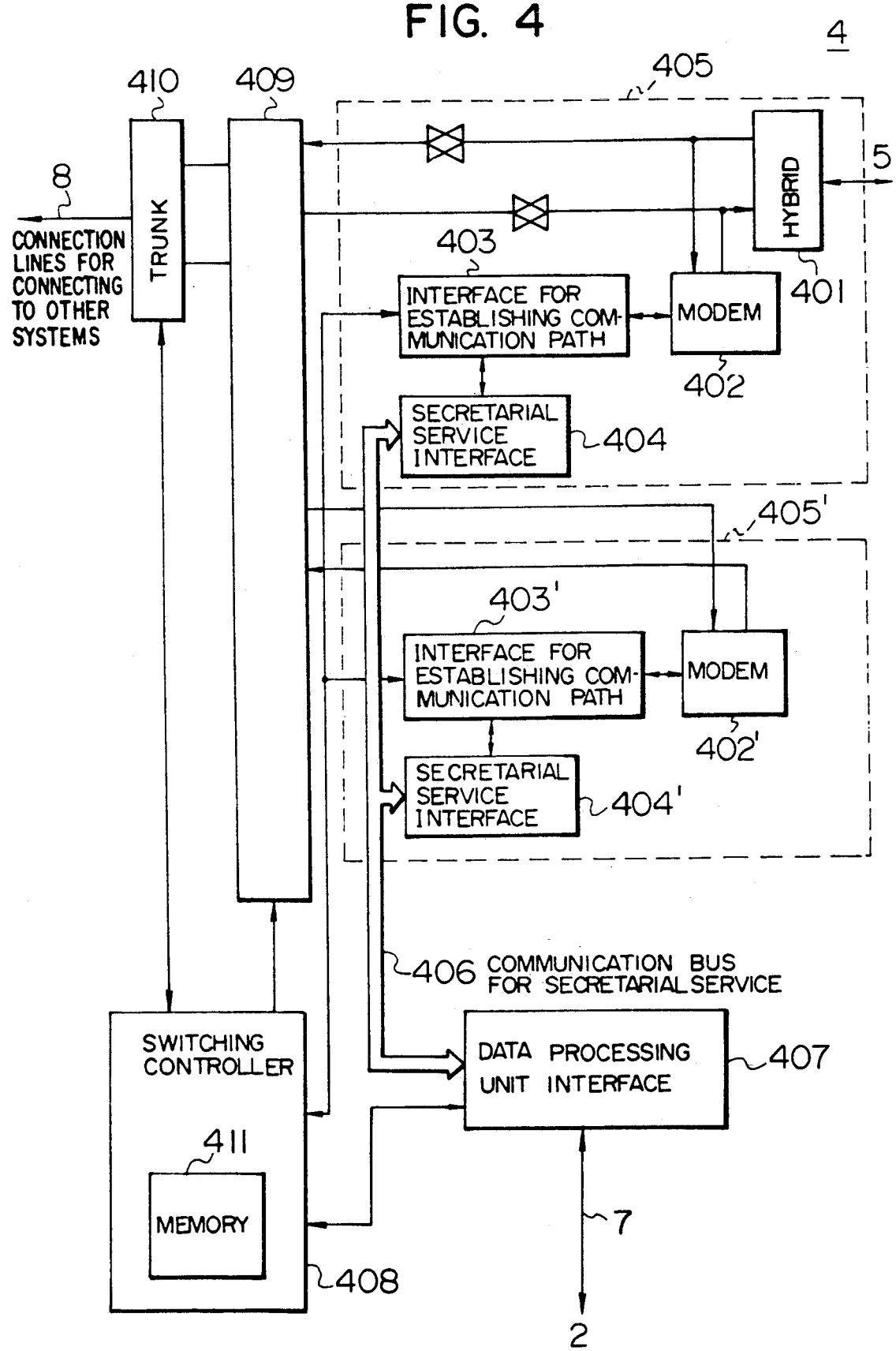
FIG. 4 is a block diagram of a communication controller.

FIG. 4 is a block diagram of the communication controller 4 (FIG. 1). In FIG. 4, a signal transmitted from the base station 3 is supplied through the connection line 5 to a hybrid 401 where it is given a path to a modem 402. This signal is then converted by the modem 402 into a digital signal. Shown at 403 is an interface for establishing communication path which checks the call initiating request signal and identification code from the terminal 1. This interface for establishing communication path, 403 has the function of transmitting an outgoing call request or the identification code of the terminal being called to the base station 3 by reference to the memory 411 of a switching controller 408 in which the identification code and the corresponding transmission address are stored. Shown at 404 is a secretarial service interface, which, after the channel setting procedure is completed, receives information from the terminal 1 through the interface 403 and transmits it to a secretarial service circuit bus 406 in a predetermined format. Shown at 405 is a connection portion to the base station 3. If necessary, a plurality of same ones may be provided, in which the respective interfaces for establishing communication path are connected to the switching controller 408 and in which the secretarial service interfaces are connected through the connection bus 406 to a data processing unit interface 407. Shown at 405' is the same as the connection portion 405 except the hybrid. This portion is provided for the communication with another system through the connection line 8. An exchanging switch 409 connects other systems, connection trunks 410 (if necessary, a plurality of trunks are provided), and the portion 405', and serves as the normal private branch exchange when the terminals are used as telephones.

The basic operation of the radio communication system of this invention will be mentioned below.

A description is first made of the operation for setting and opening the communication channel between the multifunction terminal 1 and the data processing unit 2.

When the terminal 1 requests a communication channel to be established, to the data processing unit 2, a call initiation demand signal is transmitted on a preset radio control up-channel.

The neighboring base terminal which received the call initiation demand signal transmits a channel specifying signal for specifying a communication channel, to the terminal on a preset control down-channel.

In this way, radio up- and down-channels are established between the terminal and the base station in accordance with the specifying channel included in the channel specifying signal.

Moreover, the base station transmits a channel connection demand signal for requesting the channel connection, to the communication controller 4. The communication controller 4 which received this connection demand signal connects the base station and the data processing unit.

According to the above-mentioned procedure, bidirectional (up and down) communication channels are established between the terminal and the data processing unit.

A description is made of the case in which the data processing unit 2 specifies a particular terminal 1 and establishes a channel to the terminal.

The data processing unit transmits a signal including the identification code of the terminal to be specified, to the communication controller 4. The communication controller 4 which received the signal, selects the neighboring base station associated with the specified terminal by reference to the memory 411 in which the relation between a plurality of terminals and base stations near the terminals is registered, and then transmits an incoming call request signal including the identification code of the specified terminal.

The base station which received the incoming call request signal transmits a channel specifying signal including the identification code of the specified terminal on the radio control down-channel.

The terminal always monitors the signal on the control down-channel in the standby mode (when not communicated), and thus when the identification code included in the signal coincides that of its own terminal, it receives that signal and establishes a receiving channel.

By the above procedure, the communication channel is established between the data processing unit 2 and the terminal 1.

When the relation between a plurality of terminals and neighboring base stations associated with the terminals is registered in the memory 411 within the communication controller, the following procedure, for example, is taken.

First, each terminal sends a signal including the identification code of its own terminal (locate registration signal) on the control up-channel in the standby mode. The sending of the signal may be made during predetermined period or by the owner's operation at the terminal.

The base station which received the locate registration signal transmits the identification code of the terminal included in that signal and the signal including its own identification code to the communication controller 4.

The communication controller 4 which received the signal from each base station controls the memory to store the relations between the identification codes of the terminals in the signal and the identification codes of the base stations. When two or more signals include the identification code of the same terminal, it is possible that the base station which received the locate registration signal transmits the strength of received signal in addition to the identification code to the communication controller 4, and that the communication controller 4 controls only a signal of greater strength to be registered. Thus, wherever each terminal is moved, it can be communicated with the base station as long as the base station is located within the range which the radio wave can reach.

After the channel is established between the terminal and the data processing unit, the bidirectional communication therebetween can be made by a predetermined procedure.

When the communication is completed, and the channel is desired to be opened, the central processing unit issues a command to stop the radio transmission from the base station and then open the channel connection to the communication controller. The terminal, when detects that the transmission of signals is stopped from the base station, stops the transmission after a predetermined card time (for example, 2 seconds), and waits in the standby mode.

A description will be made of th operation for supplying data within the terminal into the memory 202 of the data processing unit.

It is assumed that data is inputted through the terminal keyboard 117 (FIG. 2) and that the data within the terminal is changed. When the internal data is changed, new data is written in the memory 130 (which includes circuits 114 to 116), or the previously stored data is updated or erased. In FIG. 2, when the data in the memory 130 is changed, or when new data is written in the memory 130 or when the previously stored data is updated or eliminated, the secretarial service circuit 111 controls the contents of data after the change and the address of the data on the memory to be stored in the temporary memory 113. Then, the secretarial service circuit 111 inquires of the communication mode control circuit 110 about whether the communication channel setting is possible or not (because the telephone mode may now be operative) in order to establish a communication channel to the data processing unit. When the communication channel setting is possible, it issues the request for the communication channel setting to the communication mode control circuit 110. The radio controller 107 makes a calling procedure for treating the data processing unit as the called party, so that a channel is established between the terminal and the base station and that the terminal is connected through the communication controller to the data processing unit.

Then, the terminal sends a signal including the data of the memory 113 and the address on the memory circuit. When the channel setting interface 403 (FIG. 4) within the communication controller, when deciding that the called party included in that signal is the data processing unit, supplies the received signal (including data after change and address on the memory) from the modem 402 directly to the secretarial service interface 404 and then fed through the connection bus 406 and the data processing unit interface 407 to the data processing unit. Then, the data processing unit causes the data included in information from the terminal to be stored in the memory 202 at the corresponding address. Then, the data processing unit copies the stored data, and sends it back to the terminal. The terminal compares the data stored in the memory 113 with the data from the data processing unit, and when both are coincident, the terminal supplies a confirm comparison signal to eliminate the end communication protocol and data in the temporary memory 113. If both data are not coincident, the terminal sends the request for resetting the data stored in the storage portion within the data processing unit to the data processing unit, and again sends the data in the temporary memory 113.

The above operation is automatically made without requiring for the owner of the terminal to operate. During the data sending operation, the operator may be informed by a display or lamp that the communication is being made, or of the criterion of normal operation.

The secretarial service circuit 111 utilizes, for example, the following data flag in order to detect the change of data on the memory 130 (writing new data, updating, elimination of data, and so on).

When new data is inputted through the keyboard 117, or the data previously stored in the memory 130 is read out and updated, the control circuit 111 adds a data flag to the inputted or updated data, and controls the memory 130 to store it.

The control circuit 111 detects the change of data within the memory 130, but concretely it detects the data added with the data flag. Thus, the control circuit 111 recognizes the data added with the data flag as "changed data", and transmits it to the data processing unit.

Then, the data processing unit controls the memory 202 to store "changed data" transmitted from the terminal and the copied data to send back to the terminal. The terminal makes the above mentioned comparison.

If the data are coincident as a result of the data comparison, the control circuit 111 resets the data flag of the corresponding data on the memory 130, transmits the comparison confirmation signal mentioned above, resets the data on the temporary memory 113, and makes the talk end procedure.

Thus, if the data flag is added upon input of data or upon updating, the change of data within the memory can be easily detected.

Moreover, the owner of the terminal may desire that the input data not be transmitted to the data processing unit because the data may be appropriated by a third person.

In such case, the following different data flags, for example, are used.

When the owner of the terminal gives predetermined instructions (operations) after inputting data, the control circuit 111 adds the data flag (second data flag) indicating "to inhibit the transmission to the data processing unit" to the inputted data, and causes it to be stored in the memory 130.

The control circuit controls the data within the memory to be automatically transmitted, but the data added with the second data flag not to be transmitted.

Therefore, the owner is able to designate data which is inhibited from being transmitted to the data processing unit in accordance with the situations such as security.

Thirdly, the operation for using the terminal as a telephone will be mentioned.

When the keyboard 117 (FIG. 2) is operated to designate the telephone mode, the secretarial service circuit 111 sets the communication mode control circuit in the telephone mode. Then, a request for calling is sent to the radio controller so that a radio channel is established between the terminal and the base station. The secretarial service circuit 111 regards the numerical input from the keyboard as a dial number, and sends the signal including the dial number through the modem to the communication controller. The address book memory may be used to easily provide the functions of autodialer and abbreviated dialing.

Fourthly, a description will be made of the operation for the comparison between the terminal backup data within the data processing unit and the terminal internal data which is carried out in a specified time period.

Referring to FIG. 1, when it comes the time set within the data processing unit 2 (for example, 0 a.m. to 3 a.m. in the midnight), the data processing unit causes the communication controller to start the auto incoming motion for individually calling each terminal. The procedure for setting channels is the same as the call initiation procedure on the terminal side, and thus will not be described. When the called terminal is ordered by the data processing unit to compare data, it checks if the secretarial service circuit 111 within the terminal can accept the data comparing operation. If it can accept, the secretarial service circuit 111 transmits this situation to the data processing unit 2. Then, the data processing unit 2 orders the terminal 1 to transmit the internal data together with the corresponding address in turn. The terminal transmits data in a predetermined memory 114 to 116 together with the address under the control of the secretarial service circuit 111. The data processing unit 2 compares the data from the terminal with the data stored in the memory 202 at each address unit. When the data from the terminal and the data stored in the memory are coincident, the data processing unit 2 sends a confirmation signal to the terminal. Then, the terminal transmits the data of the next address. If the data processing unit 2 detects any discord in the data, it updates the data in the memory 202 into the data received from the terminal or may send the information of the command in a form of electric mail to the terminal, which causes the electric mail memorizing circuit to store it and which waits for the terminal owner to give suitable instructions.

It is also possible to modify the data on the memory 202 into new data at that time by, for example, comparing the time preset in data without waiting for the instructions from the terminal owner. If those preset times are coincident, information of the coincidence in data may be sent to the terminal.

Moreover, the data processing unit may simultaneously perform the comparing operations for a plurality of terminals in a time sharing manner. The time taken to make the comparing operation for each terminal will be about 10 minutes if the data speed on the communication channel is 1200 b/s (the actual possible data speed on the communication channel is 2400 b/s, and in order to reduce the transmission error in the transmission line or to prevent the malfunction of the system due to the transmission error, it is necessary to provide the error correction function and the detection function. To this end, in this embodiment, the substantial data speed is selected to be half the value, 2400 b/s) and if the amount of data within the terminal is 100 K bytes.

When the number of terminals is larger than several tens or one hundred, it is desired that the comparing operation be made in a time sharing manner. In this case, if the number of the terminals for which the comparing operation is made in a time sharing manner is about ten, the total time to be taken for the completion of all comparing operations will be about 2 hours in the midnight time zone.

As described above, the data stored in the memory of each terminal is stored in the memory within the data processing unit. Therefore, the owner of each terminal can obtain particular data from the data processing unit by designating the names of desired recorded data.

In addition, when inputting of data is made at the terminal, it is possible that a pass word is also inputted, and that the data and the pass word are registered in the memory 202 in accordance with the above-mentioned procedure. When data is obtained from the data processing unit, it is possible that a pass word is added to the read request signal and that the pass word and the request signal are transmitted to the data processing unit. In the data processing unit, the pass word of the specified data is read from the memory 202 and compared with that included in the read request signal, and only when they are coincident, the data can be read, thus reading by a malicious third party being prevented.

A description will be made of an example of the group scheduling application using this system.

Figure 5:
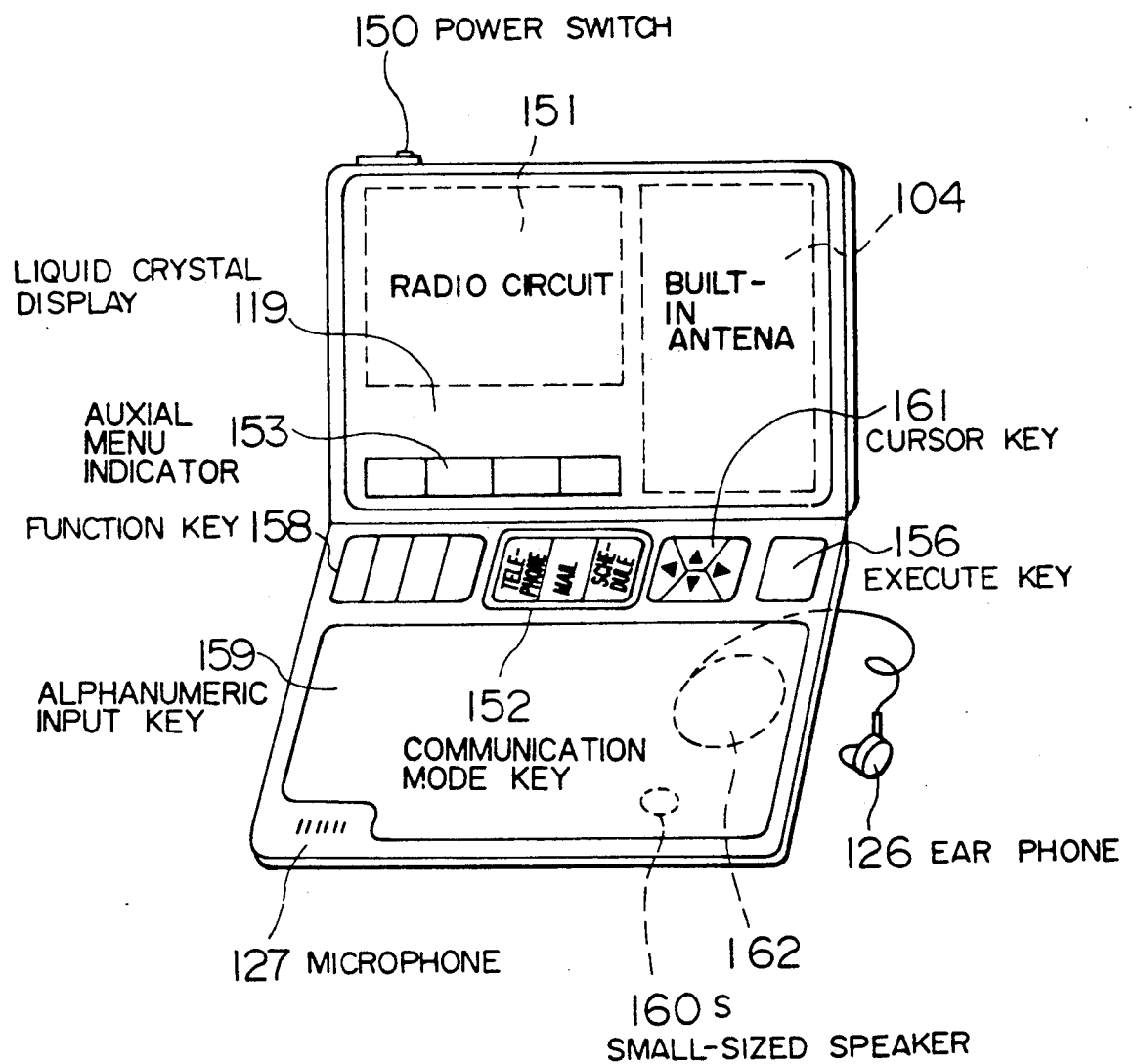
FIG. 5 shows an external appearance of the portable terminal according to this invention.

FIG. 5 shows the layout of an electric secretarial terminal.

On one surface of the folding type terminal is provided a function key 158 and a communication mode key 152. The former is used for designating the modes other than the communication mode such as dictionary function and computation function. The latter is the key for selecting the communication function mode of the terminal, such as telephone, mail and schedule. An auxiliary menu indicator 153 indicates a concrete process for the selected mode. When any one of the communication modes is selected, it is indicated on a liquid crystal display 119. The auxiliary menu selection is performed by a cursor key 161. Shown at 159 is an alphanumeric input key by which the operator makes the input to the terminal. The liquid crystal display 119 indicates information of communication and the information inputted by the input key 159. The cursor key 161 makes scrolling of pages and movement of lines and letters. Shown at 156 is an execution key. When this key is depressed, the inputted information is registered for the terminal or transmitted. The earphone 126 and microphone 127 serve as the handset of telephone when the terminal is used as a telephone. A small loud speaker 160 emanates sound each time of key input and receiving, thereby stimulating the operator's attention. Shown at 104 is a built-in antenna for transmitting and receiving high-frequency signals between the terminals. A radio circuit 151 receives and demodulates a high-frequency signal and it modulates information made at the terminal, on a carrier and transmits the modulated signal. Shown at 162 is a cord reel for drawing the connection cord of the earphone 126 into the inside of the terminal. Shown at 150 is a power switch which has positions of ON, OFF and standby. For example, in the standby mode, receiving and answer-back for the signal can be permitted to reduce the power consumption.

A description will be made of the way to make schedule communication such as a meeting-open notice by use of communication terminals.

When "schedule" is selected by the communication mode key, preparation of draft, notice of schedule, indication of schedule and attendant search are displayed as an auxiliary menu on the lower side of the display.

The preparation of draft is necessary for knowing the persons who want to attend the meeting, the notice of schedule is for notifying each person of a fixed schedule, the indication of schedule is for displaying the schedule received by the notice of schedule or a schedule on a given day, and the attendant search is for checking the attendants in the meeting with the notified schedule.

First, the preparation of draft is selected. The input to the terminal is made on the display screen as shown in FIG. 6, in a conversational mode. The operator answers the question displayed. This conversational answer processing is made by the portable terminal mentioned above. The operator inputs the day for a meeting and the place of the meeting, the schedule name for determining the name of the meeting, the purpose of the meeting, the names of the expected attendants and the grade of importance in attending the meeting. The input to the terminal is made at each matter by depressing the execution key. The grade of importance in attending the meeting is divided into, for example, three ranks, I, II, and III in which order the grade of importance is increased. At the end of inputting these matters, when only the execution key is depressed with respect to one line on the display, the terminal regards this operation as the end of the input.

Figures 7, 8:
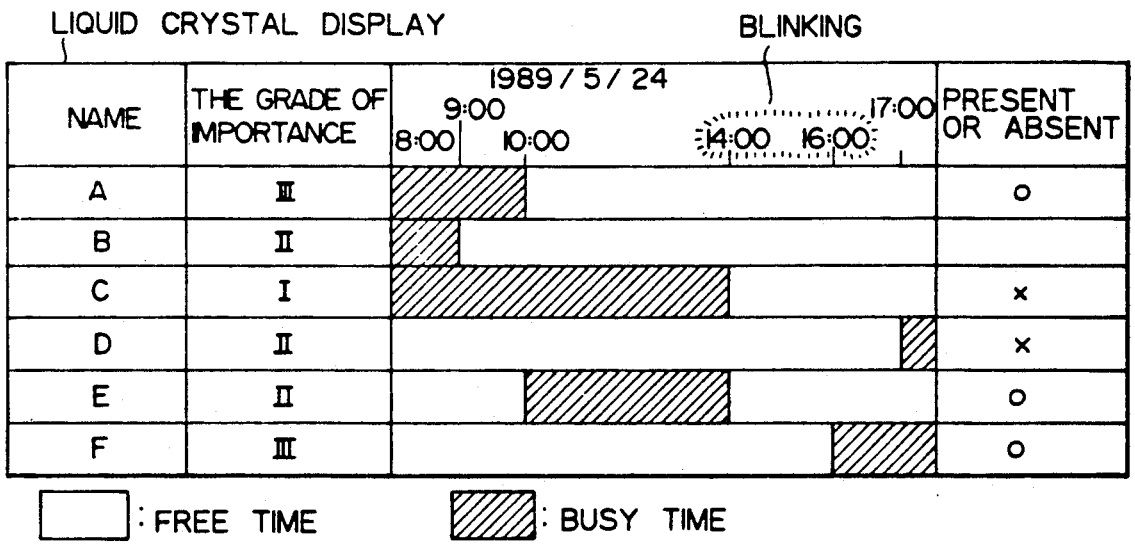
FIG. 7 is a diagram useful for explaining the procedure for the input confirmation at the time of preparing the draft.
FIG. 8 shows schedules for respective persons who will attend a meeting.

When all the matters have been inputted, they are indicated on the display of the terminal for the purpose of confirmation as shown in FIG. 7. The question of "Do you send this schedule ? Y/N" is indicated on the lower side of the display screen. If the operator requires no change of the indication, the key of Y is depressed, and if not so, the key of N is depressed. When Y-key is depressed, them terminal transmit this indicated information to the data processing unit. When N-key is depressed, the cursor key is operated to indicate the matter to be changed, and again inputting is made.

When this indicated information is arrived at the data processing unit, the data processing unit extracts the names of the persons who want to attend from the sent information, and searches the schedule of each person in the memory 202 of the data processing unit on the basis of the key word of the name and day's schedules. Then, the free time of each person is found from the schedule.

First, if the period of the meeting does not overlap on the schedule of each person, the time zone of no overlap is determined as the day and time on which the meeting can be held. If the period of the meeting overlaps the schedule of each person, the grade of importance requested by each terminal is compared with that of the schedule of the person. If the grade of importance from the terminal is higher, that time zone is treated as free time. If the result is the same grade of importance, a previous engagement is preferentially treated. In this way, a time zone which meets the requirements of all persons is found and a schedule is fixed. The data processing unit transmits information including the result of the fixed schedule to the calling terminal. The terminal receives the schedule of each person and displays it. FIG. 8 shows an example of this indication. When all persons have free time, the free time zones are blinked for easy finding. When there is no free time, the message of no free time or the like is displayed to blink (FIG. 8 shows the case of having free time). The column of present or absent in FIG. 8 will be mentioned later together with the expected-attendants search operation in FIG. 8.

For searching this time zone, a method can be considered in which on the terminal side a desired time zone, for example, a.m./p.m. or a fixed time and the time at which the meeting will be held are inputted and on the data processing unit side the free time in each person's schedule and the desired time zone which meets the demand of each terminal are extracted. If the time zones of all persons to attend the meeting do not coincide, the day of the meeting is changed in the draft mode or a schedule is fixed, and sent in the schedule notice operation which will be described later.

When the draft is prepared, and the day and time zone of the meeting are fixed as described above, a notice of a fixed schedule of the meeting is selected in the auxiliary menu and sent to each terminal.

The notice of schedule includes the period of the meeting in addition to the forms shown in FIG. 6. Also, the period of the meeting is displayed as the forms shown in FIG. 7, and after confirmation of information it is sent to the data processing unit. This input operation is the same as in the draft preparation except that the period of the meeting to be held is added. The data processing unit makes a key word of the name of each person who wants to attend, searches the channel number and notifies each terminal of holding the meeting. This notice is stored as a schedule of each person.

The way to read a schedule by use of a terminal will be mentioned.

When a notice of schedule is sent as described above, the terminal which has received the notice causes the small-sized speaker to sound, informing that the notice is received, and permits the display to indicate the schedule. Thus, the terminal can excite the operator's attention to the occurrence of the communication operation and inform the operator of what kind of operation has been made. The operator of the terminal depresses the schedule key in response to the sound and display. On the other hand, the operator of the terminal sometimes depresses the schedule key for knowing his own schedule. In either case, thereafter the schedule display is selected from the auxiliary menu. When as in the former case a schedule is received and the schedule display is selected, the occurrence of receiving a schedule is indicated by a flag within the terminal (for example, schedule memory 116). When the flag is raised, the received schedule is immediately displayed, and the flag is fallen. The flag is used for checking if the schedule display has been selected after receiving the schedule or at an arbitrary time. FIG. 9 shows an example of the display of a schedule. When as in the latter case the schedule display is selected at an arbitrary time, a question of what day's schedule is to be displayed is indicated as shown in FIG. 10. Thus, when the question is answered by inputting the date and depressing the execution key, the terminal transmits the information of date to the data processing unit, and the data processing unit sends the schedule of that day back to the terminal.

The way to store the schedules in the data processing unit will be described below. When the time zones of schedules overlap as described in the draft preparation, the most preferential schedule is determined and stored in accordance with the grade of importance, and the schedules of low grade of importance are all stored. Under this condition, in order to send the schedules to the terminal, the most preferential schedule is indicated by a raised flag so that it can be easily found by the terminal. An example of the display at this time is shown in FIG. 11. All the schedules on certain dates are displayed and the most preferential schedule indicated by the flag is displayed as inverted black and white or by blinking on the display screen. If, for example, the most preferential schedules which the data processing unit treats as are indicated by 11a, 11d, 11e, the rows of the scheduled 11a, 11d, 11e are displayed in inverted black and white and the rows of the schedules 11b, 11c are displayed as usual. When the information such as place and attendants which are not displayed are desired to know, the cursor key is operated to move the schedule name frame and the execution key is depressed, thus bringing the indication shown in FIG. 9.

Why all the schedules are stored and displayed as shown in FIG. 11 is that the operator of each terminal can select a schedule in accordance with the degree of importance which the operator himself decides, not with the three ranks of the degree of importance. The operator watches this display, decides if he attends the meeting, inputs, for example, Y for presence, or N for absence in the presence or absence column of the display, and depresses the execution key. Thus, the terminal sends information of the date and time of the meeting, the names of the schedule, the names of the person who sends the information, and the presence or absence to the data processing unit. The data processing unit searches the schedules on the basis of the key words selected from the date, time of the meeting, name of schedule and the person who sent, and writes the answer to each person into the schedule stored portion of each person.

When the situation of the presence and absence in the meeting is desired by the person who sent the schedule, the persons-present search is selected from the auxiliary menu. When this is selected, the kind of the schedule which the person sent is first displayed as, for example, shown in FIG. 12. Then, the cursor key is operated to move the indication frame to the schedule name and the execution key is depressed. Thus, the schedule name and the date and time of the meeting are transmitted to the data processing unit. The data processing unit searches the scheduled on the basis of the three pieces of information, and extracts the persons who want to attend. In addition, the key words of each person who wants to attend and the three pieces of information are used to extract the information of presence or absence of each person in the meeting from the schedule memory of each person. This information is fed back to the terminal where it is displayed. The presence and absence are indicated by ○ and × in the presence/absence column shown in FIG. 8.

The schedule communication mentioned above will reduce the labor and time which are taken for setting the date and time of a meeting.

In addition to this schedule communication, there are other communication modes such as telephone and mail. The auxiliary menu for telephone includes dial setting, abbreviated dialing and auto dialing. The dial setting is selected, the channel numbers are registered in the terminal. and abbreviated dialing and auto dialing are selected to make operations as in the conventional additional functions of telephone.

The auxiliary menu for the mail can include mail preparation, mail transmission, and mail reading, by which the mail transmission and reception can be made by the conventional method.

A second embodiment of a radio communication system of this invention will be described in detail with reference to the drawings.

FIG. 13 is a schematic diagram of the second embodiment of a radio communication system of the invention. A private branch exchange (PBX) 11 is connected through private telephone lines 21 to 23 to base stations 31 to 33. The subscribers have portable telephones 41 to 43. The portable telephones 41 to 43 are connected by radio waves to any ones of the base stations 31 to 33 upon talking. In FIG. 13, the portable telephone 41 is connected to the base station 31 by a radio wave, but always not connected thereto. The portable telephone can be connected to the most suitable base station at each time of talking. The private branch exchange 11 connects the channels among the base stations and also connects the extension telephones to the public telephone network 51 to 54. A mass storage 13 stores charging information, positional information of the portable telephones and so on. A controller 12 refers to the mass storage 13, and controls the private branch exchange 11 to connect the channels within the branch exchange.

Since in this embodiment the portable telephones are moved together with the owner or user, the private branch exchange 11 must always follow the locations of the portable telephones. In this embodiment, the base stations 31 to 33 periodically transmit location information signals including the identification code ID of each base station. The format of the transmitted signal is shown in FIG. 14. The location information signal, 500 is formed of a preamble for synchronization 510, a base station identification 520, command information (command for indicating location information) 530, an incoming restriction flag 540, and an outgoing restriction flag 550. The flags 540 and 550 indicate an outgoing restriction level and an incoming restriction level, respectively. The portable telephone can detect its own location around a known base station, from this signal, and thus upon talking it is found which base station the portable telephone can be connected to. Each portable telephone sends the base station ID included in this information and its own ID to the private branch exchange 11 each time it changes in its position. The transmitted information is supplied through the control circuit 12 to the mass storage 13 where it is stored. Thus, the private branch exchange 11 is able to detect the locations of the subscribers (portable telephones), and thus upon calling to a subscriber, a correct base station can be selected.

FIG. 15 is a block diagram of the portable telephone in the radio communication system of this invention.

The portable telephone 41 comprises a radio circuit section, a microprocessor section and a peripheral circuit section thereof. The radio circuit section includes the antenna 104, the receiving circuit 102, the transmitting circuit 101, the synthesizer 105 as an oscillator for determining the frequency, the voice circuit 125, the loud speaker 126, the microphone 127, the modem 106 for modulating and demodulating a digital signal such as a communication control signal and a electric mail, and the voice message recording circuit 128 for storing the voice message transmitted or the voice message being transmitted. The radio circuit section is controlled by a microprocessor (CPU) 921 through a radio control I/O 920. The microprocessor section includes a ROM 922 having a program stored therein, a RAM 923 serving as a memory which data can be written in and read from, an interrupting timer 924 for the occurrence of an interruption at each constant time relative to the microprocessor (CPU) 921, a clock 925 for indicating the present day and time, a key scanning circuit 118 for reading in the information associated with a key 117, the display driver 120 for driving a display 919, and a bell driver 930 for ringing a bell 931.

The radio portable telephone 41 has a plurality of communication modes such as talking by voice, storage of voice message, electric mail with ringing and electric mail with nonringing, and makes automatic switching of these communication modes on the basis of the information specified in a schedule and the present positional information. The portable telephone has the function (address book manager) for controlling the private information such as address book other than the schedule control function. In this specification, hereinafter, the scheduler manager, address book manager and communication manager are called together as a secretarial service function.

Figure 16:
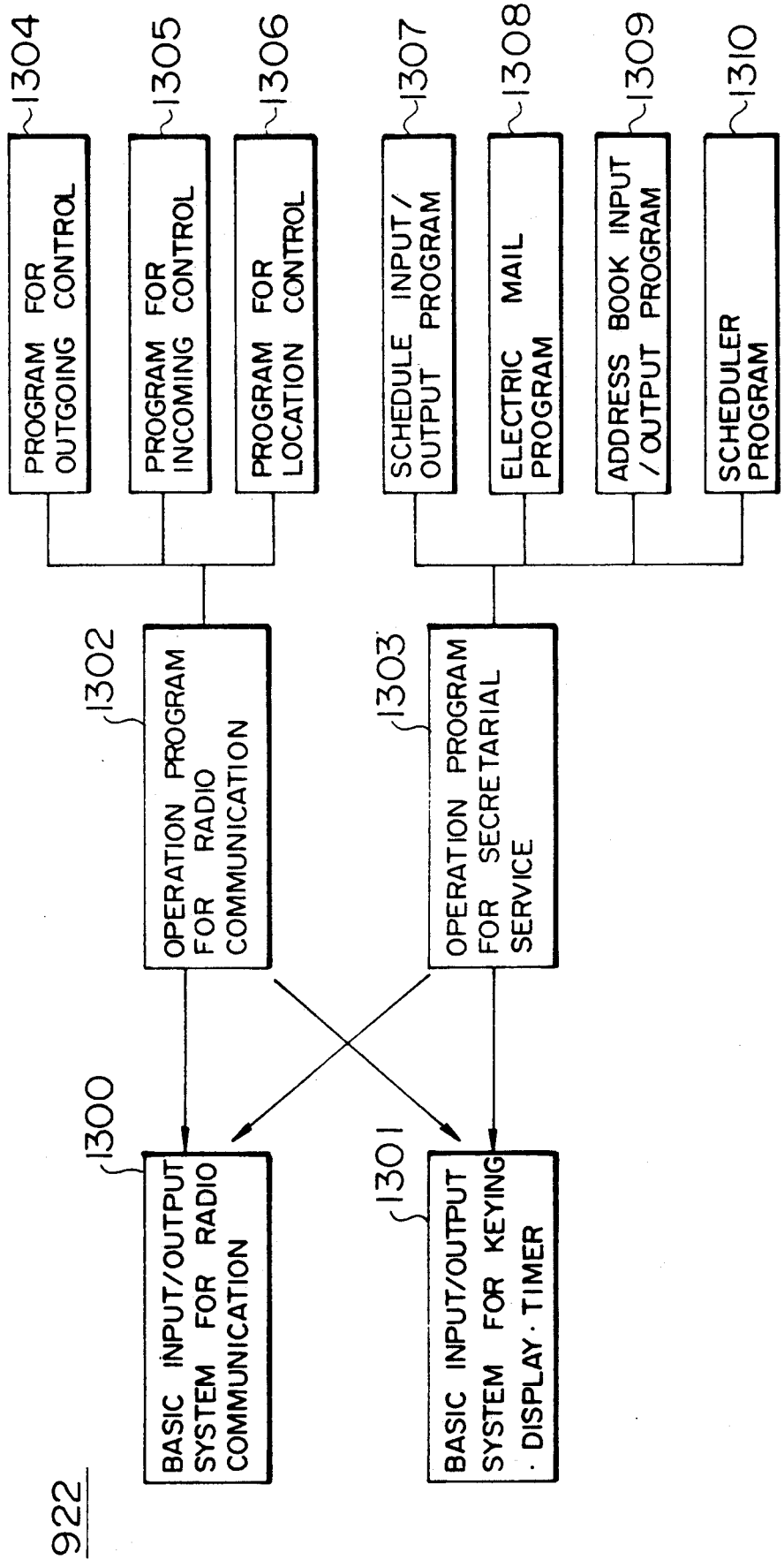
FIG. 16 is a schematical view of a control program for the portable terminal.

The CPU 921 makes radio control and control of secretarial function, and the program for these control operations is stored in the ROM 922. FIG. 16 shows the contents of the stored program in the ROM 922. The program includes a basic input/output system BIOS, 1300 for radio communication, serving as a subroutine group for controlling the radio system, a basic input/output system BIOS, 1301 serving as a subroutine group for keying, display, timer, clock and bell, an operation program 1302 for radio communication, and an operation program 1303 for secretarial service, as the program of application level. The operation program 1302 for radio communication includes a program 1304 for outgoing control, a program 1305 for incoming control, and a program 1306 for location control. The operation program 1303 for secretarial service includes a schedule input/output program 1307, an electric mail program 1308, an address book input/output program 1309, and a scheduler program 1310.

Figure 17:
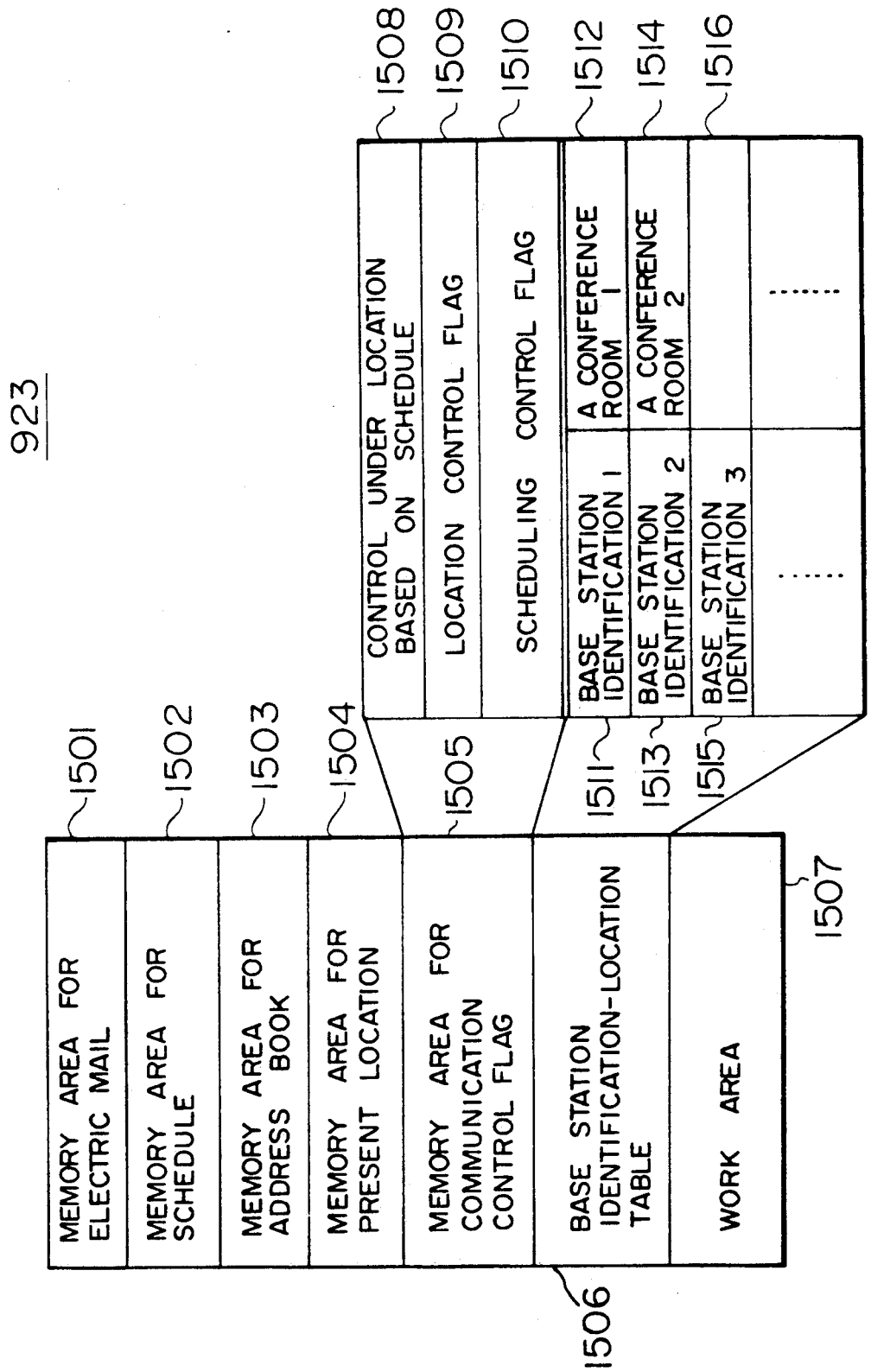
FIG. 17 shows a memory map of a RAM of the portable terminal.

FIG. 17 shows a memory map of the RAM 923. The memory map 923 comprises a memory area 1501 for storing electric mail to be transmitted or received, a memory area 1502 for schedule a memory area 1503 for address book, a memory area 1504 for present location, a memory area 1505 for communication control flag, a base station identification-location table 1506 for storing the relation between the base station ID signal and the location of conference room or the like, and a work area 1507 for use in stack area or the like.

Although the terminal 1 in the first embodiment includes the radio controller 107 for radio channel control and the communication mode control circuit 110 in addition to the microprocessor 111 having the secretarial service function, in this second embodiment the CPU 921 executes the programs 1304 to 1310 stored in the ROM 922, thereby making the same processing. While the microprocessor 111 in the first embodiment permits the data received through the antenna 104 and the data inputted through the keyboard to be stored in the memories 114 to 116, 113 associated with the kinds of the data, in this second embodiment these data are stored in the areas 1501 to 1507 on the RAM 923. The provision of a processor for exclusive use for each processing function and the provision of a memory device for exclusive use for each piece of data can be arbitrarily combined in accordance with the speed of communication channel, amount of data to be treated, and necessity for miniatuarization of portable terminals.

The restriction for communication modes includes two cases: the restriction based on the signal from the base station (communication restriction by location) and the restriction inputted when the user sets a schedule (communication restriction by the schedule).

Figure 18:
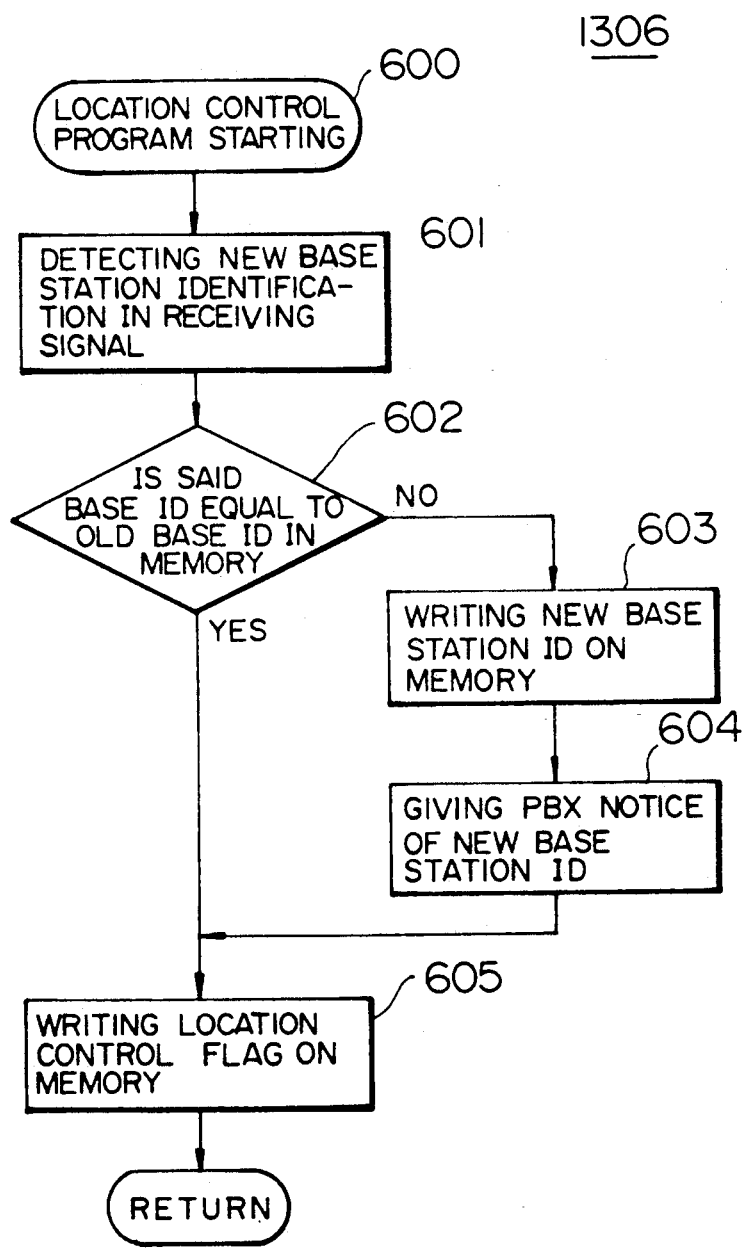
FIG. 18 is a flowchart of the location monitor program for the portable terminal.

The communication mode which the portable telephone eventually selects is either one of the receiving mode determined on the basis of the communication restriction by the location and the receiving mode determined on the basis of the communication restriction by the schedule. The details will be described later with reference to FIG. 22. The communication restriction depending on the location is determined by the contents of the incoming restriction flag and the outgoing restriction flag included in the location information signal 500 (FIG. 14). The monitoring of the communication restriction depending on the location and the recognition of the present location are performed by the location control program 1306 (FIG. 16). This program 1306 is started to execute when the location information signal from the base station is received by the modem 915. FIG. 18 is a flowchart of the location control program 1306. The base station ID is detected from the received location information signal (step 601), and compared with the previous base station ID registered in the present location memory area (step 602). If it is different therefrom, the base station ID included in the received location information signal is written in the present location memory area 1504 (step 603) and the base station ID is sent to the private branch exchange (step 604). The private branch exchange stores the base station ID as the ID of the base station which that portable telephone can now utilize. Thus, the present location of the portable telephone is registered in both the portable telephone itself and the private branch exchange. After this processing, the communication control flags 540, 550 included in the location information signal are written in the location restriction flag memory area 1509 of the communication restriction flag memory area 1505 (step 605).

On the other hand, the restriction depending on the schedule is performed by setting the contents of the communication restriction when the user inputs the schedule. FIG. 19 shows an example of the inputting of the schedule and the setting of the restriction level. In this example, in the first conference room, the incoming call is limited to the nonringing communication, and the outgoing call to the nonvoice frequency communication, during the time, 10:00-12:00.

The communication mode regarding the restriction, as shown in FIG. 20, depends on the communication restriction level such as communication with ringing, nonringing communication, and voice frequency communication, nonvoice frequency communication. For example, the electric mail with ringing is the mode in which a ringer rings the instant that a mail is received. The electronic mail indicates the digital character communication mode such as address book communication, schedule communication, or communication of base station ID-location list.

FIG. 21 shows the format of the communication restriction flag memory area 1505 within the RAM 923. The communication restriction flag, or the incoming restriction flag, the outgoing restriction flag is, as shown in FIG. 21, formed of three flags: the incoming (outgoing) prohibition flag, the ringing prohibition flag and voice communication prohibition flag. The incoming (outgoing) prohibition flag 91 indicates to inhibit all incoming (outgoing) signals the ringing prohibition flag 92 indicates to inhibit the communication accompanied with ringing, such as the talking communication and the electric mail with ringing, and the voice communication prohibition flag 93 indicates to inhibit communication by voice such as the talking communication and the voice message.

The relation between the "communication restriction depending on the location" and the "communication restriction depending on the schedule" is shown in FIG. 22. When there are two cases of communication restriction, the communication restriction depending on the schedule has priority over that depending on the location. However, when it is difficult to go to the place at a predetermined time for some reason despite the communication restriction set in a schedule for a meeting, it is desired that the communication restriction be ineffective. Therefore, when the related person is not present at a specified place at a time set in the schedule, the "communication restriction depending on the location" at that location has priority over that depending on the schedule.

The operation flow at the time of incoming call will be described with reference to FIG. 23.

The portable telephone 41, when receiving a signal for requesting the incoming call from the radio base station, starts the incoming control program 1305.

At step 700, it is determinded by the location specified by the schedule and the present location information that the communication restriction flag (here, incoming restriction flag) for use in determining a communication mode is read from the location communication restriction flag or from the schedule communication restriction flag. The further details thereof will be mentioned later with reference to FIG. 24.

When the communication mode determined at step 700 is the mode in which all incoming calls are inhibited (incoming call prohibition mode), the calling party is notified of the incoming call prohibition mode (step 711). When the communication mode is the others (communication mode and so on), the program advances to the next step (step 710).

Then, the communication mode is sent to the calling side (step 712), and a response signal from the calling side is waited. After the response signal is received, the program progresses to the next step (step 712).

When the request communication mode included in the response signal from the calling side is an emergency communication mode (which will be described later with reference to FIG. 25), the program is advanced (step 714) for making some communication (steps 717, 719, 721, 723) without no comparison between the communication mode of the portable telephone and the request communication mode included in the response signal from the calling party.

At step 715, the above-mentioned communication modes are compared. If there is no coincidence, the fact of no arrival of the call is transmitted to the calling side (step 724), and the processing ends.

If the communication modes are coincident, the related communication mode is identified at steps 716, 718, 720, 722, and each communication is made (step 717, 719, 721, 723). Then, the processing ends (step 725).

Figure 24:
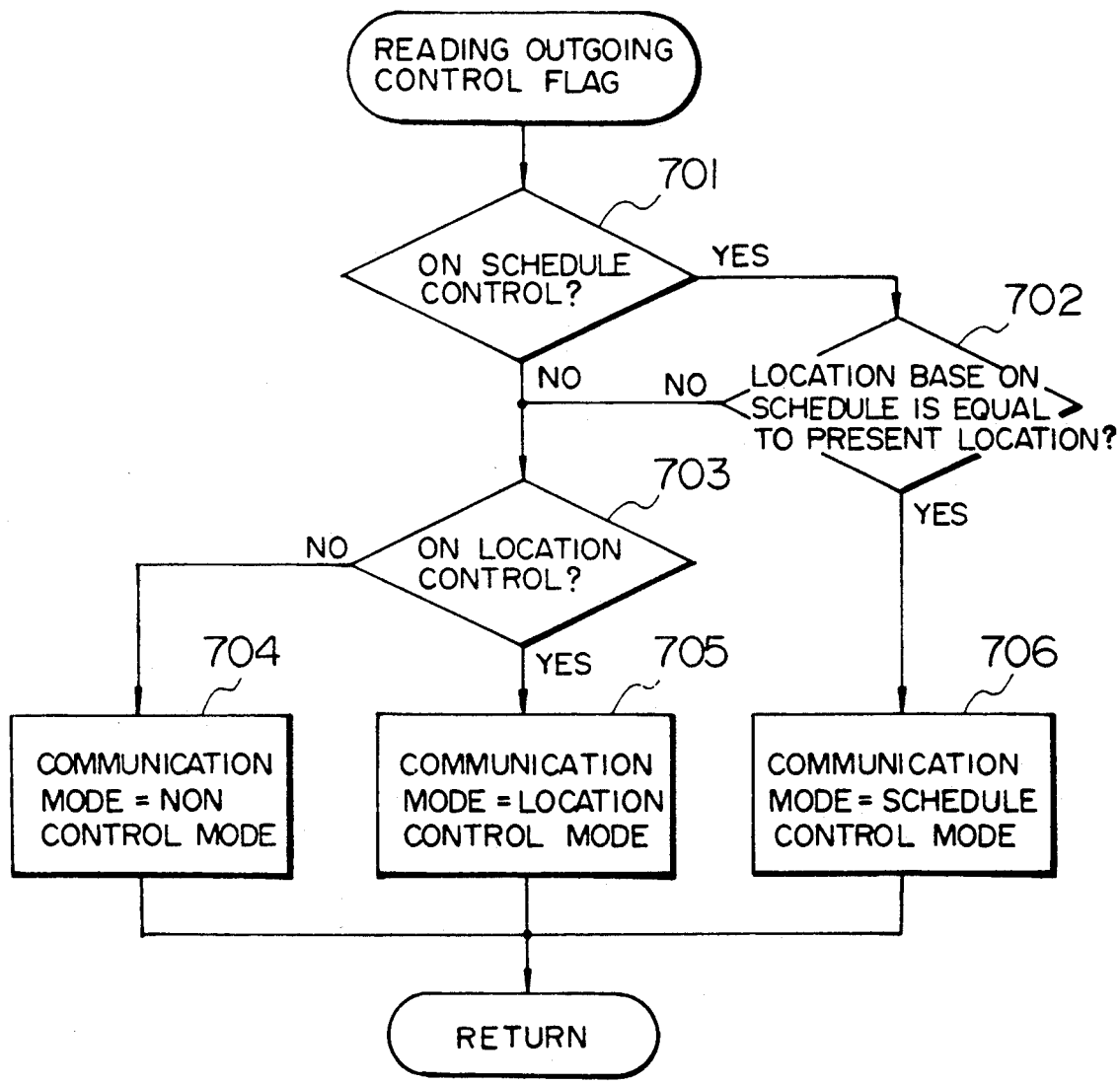
FIG. 24 is a flowchart for the selection of an incoming call restriction.

FIG. 24 is a detailed flowchart of step 700 of the program 1305.

At step 701, it is checked if the communication restriction is set in the schedule at the present time.

If the communication restriction is found to be set at step 701, the location set in the schedule and the present location are compared (step 702). If the result of the comparison is that the locations are agree, the communication restriction set in the schedule is employed as the incoming call restriction (step 706). If there is no agreement, the program progresses to the next step 703. If at step 701 it is found that no communication restriction is set, it is checked if the communication restriction is set in the signal 220 (FIG. 14) from the base station (step 703).

If it is found that there is the so-called "communication restriction depending on the location" from the result at step 703, the communication restriction depending on the location is employed as the incoming call restriction (step 705). If there is no "communication restriction depending on the location", it is decided that there is no communication restriction (step 704).

Figure 23:
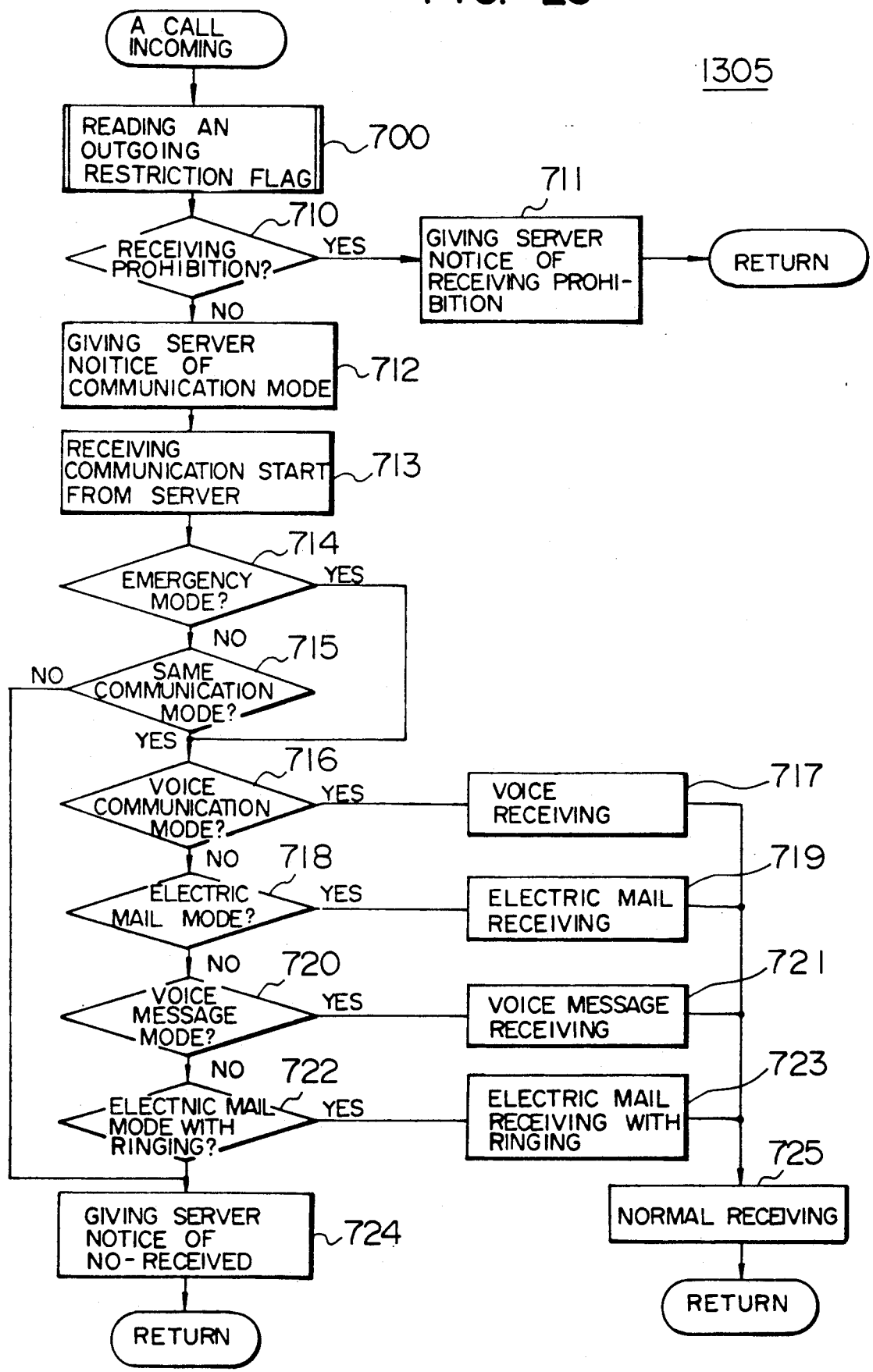
FIG. 23 is a flowchart for the operation at the time of an incoming call.
Figure 25:
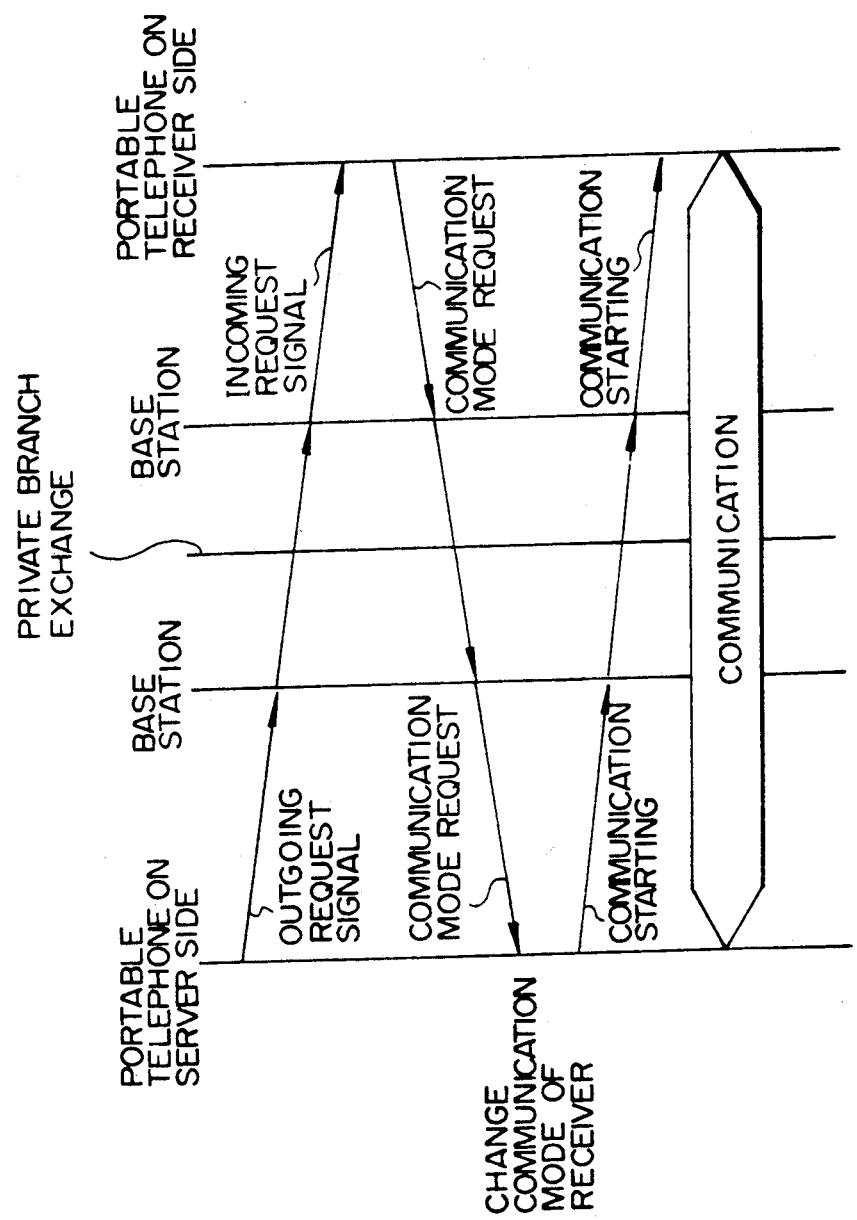
FIG. 25 shows the communication between the calling side and the called side.

FIG. 25 is a diagram useful for explaining the communication between the calling party and the called party at steps 712 to 713 (FIG. 23). The communication mode on the calling side is transmitted to the called side. If the communication mode which the calling party first requested is possible, the communication start signal is automatically transmitted from the calling party. If there is no possible communication mode, the request for the change to the communication mode in which the call can be received is indicated on the display of the calling side. If the calling party selects the restricted communication mode, the called side forces the communication to end. However, if the communication is emergent, the calling party pushes the restriction release key of the key 117, adding a signal indicative of emergent call to the communication start signal so that the call can be received without use of the incoming call restriction. However, this key is permitted to only once push after receiving the communication mode request signal in FIG. 25, for avoiding the abuse of the key.

Figure 26:
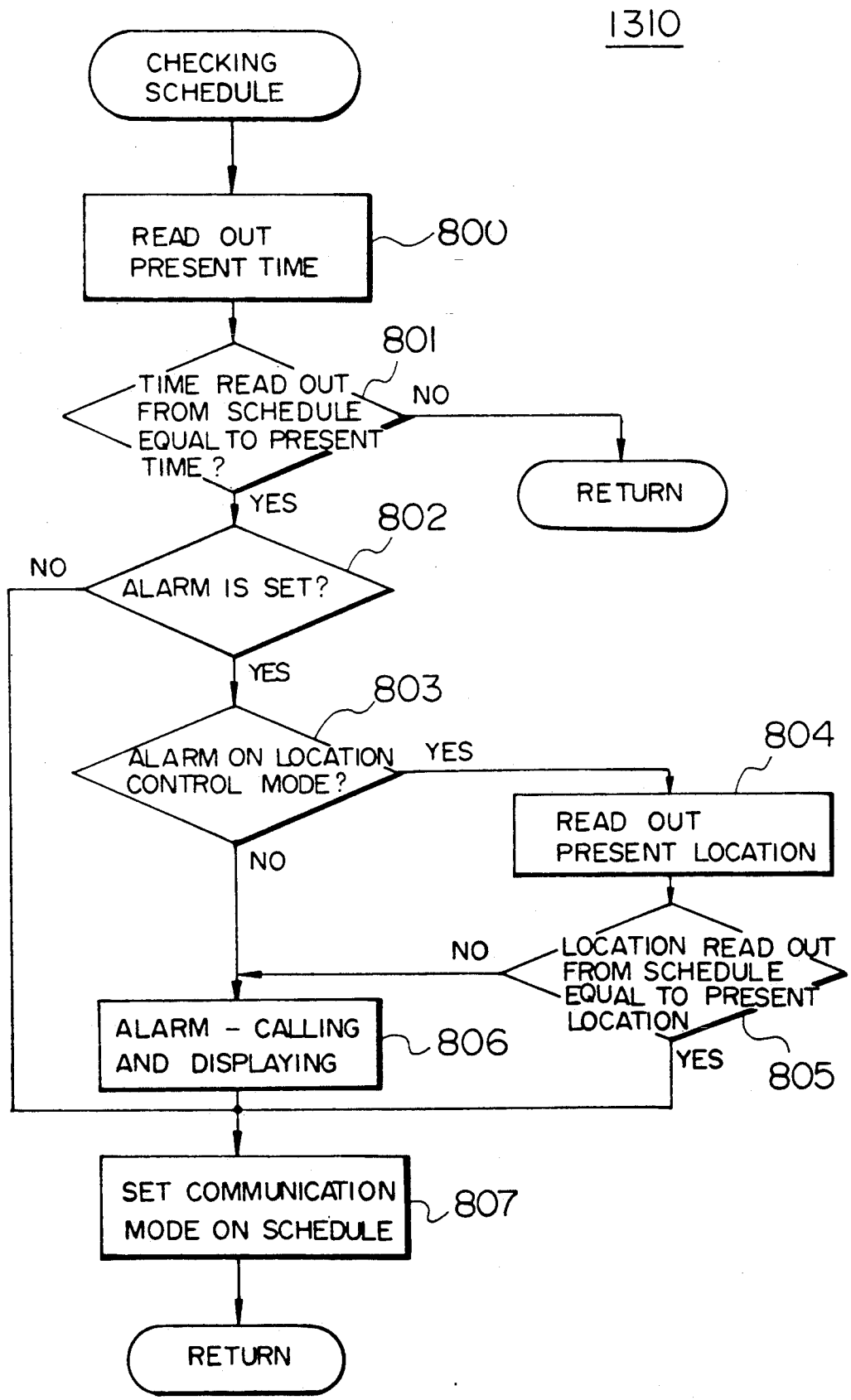
FIG. 26 is a flowchart for the operation of the alarm in a schedule.

According to this invention, the present location information and the schedule information are used, and when a person is not at the corresponding location at a time set in the schedule, an alarm is issued against the owner, or operator of the telephone. The alarm is issued by controlling the bell 931 by the bell driver 930 so that the alarm tone is different from the normal ringing tone. If at the time of input in the schedule the location calling is made on as shown in FIG. 19, no absence in the first conference room at 10:00 will result in ringing and indication of this fact on the display. If the related person is present in the conference room, no alarm is issued. Thus, it is possible to avoid the attendance at a meeting from being forgotten and the useless ringing in the meeting. This function is executed by the schedule check program 1310 as shown in FIG. 26.

At step 800, the present time is read from the clock 925 and stored in the memory 923.

The present time is compared with the time set in the schedule (for example, the time at which the meeting is started in FIG. 19) (step 801). If the comparison reaches no coincidence, the processing ends. If there is coincidence, the program goes to the next step 802.

At step 802, it is decided if an alarm is set in the corresponding schedule. This alarm may be set by operating a separately provided switch on the portable telephone. As described with reference to FIG. 19, when a schedule is set, another "location calling" column may be provided to set the schedule.

When an alarm is set, the program advances to step 803, and when an alarm is not set, the program goes to step 807.

At step 803, it is decided if "ON" is set in the "location calling" column of the corresponding schedule, or if a check alarm on location is set.

When the check alarm on location is not set, an alarm is issued for a predetermined period of time, and this fact is indicated on the display (step 806).

When the check alarm on location is set, the present location is read (step 804), and the read present location is compared with the location set in the schedule (step 805). If the comparison reaches no agreement, the program goes to step 806. If the locations are coincident, no alarm is issued and the program advances to step 807.

At step 807, the incoming call receiving restriction flag is set in the schedule, or a communication mode is set, and the processing ends (return). This schedule check program is periodically executed by the interrupt caused by the interrupting timer 924.

The party concerned with the meeting sends a notice of opening the meeting to the persons who are to participate in the meeting, by means of electric mail or schedule communication. When the schedule communication is used for the notice, it is possible to set so that ringing is made if the related person is absent in the meeting as described above. When necessary matters are registered in the schedule at the telephone terminal of the meeting opening party, the electric mail having a ringing mode is automatically sent to each person when all persons are not in the conference room at the meeting time. Alternatively, the speech stored in the automatic calling voice message circuit is sent in the normal voice channel mode. This enables the percentage of attendance increase.

According to the radio communication system of this invention, it is possible to realize the terminal capable of automatically switching the receiving modes.

To be concrete, since the portable terminal has a plurality of communication modes and is capable of automatically switching the modes if necessary, it is possible to reduce the number of calls of low importance during a meeting, and necessary contents can be transmitted by nonringing communication such as electric mail and the voice messages. Since the communication modes can be automatically switched by the schedule and the present location, it is not necessary to switch the complicated modes which change according to the situations, convenience is increased, and it is possible to avoid the mode switching operation from being forgotten. Moreover, since it is noticed that at a fixed time the related person is not at the place indicated in the schedule, it is possible to prevent the attendance at a meeting from being forgotten. Furthermore, since the base station ID-location table necessary for location information is automatically sent from the private branch exchange, it is not necessary to manually input at each change.

We claim:

1. A radio communication system comprising a plurality of portable radio telephones for making voice and data communication between the radio telephones within a service area formed by a plurality of radio zones, comprising:

a relay means for making a communication channel between the radio telephones, said relay means including a plurality of base stations placed in respective radio zones and an exchange station connected to each of said base stations, each of said base stations having a radio communication means for interchanging signals with the radio telephones contained within the respective radio zone of said base station, said radio communication means having means for receiving a calling request from a one of said radio telephones wherein the calling request includes an ID number of an other radio telephone of the plurality of radio telephones, said radio communication means having further means for transmitting said calling request to said exchange station, said exchange station having means for transmitting said calling request to a second base station, said second base station having means for receiving said calling request from said exchange station and having radio communication means to interchange radio signals with the other radio telephone having the ID number contained in said calling request when the other radio telephone is within a radio zone of said second base station and thereby establishes a communication channel on which a communication signal received from said exchange station is transmitted to the other radio telephone, said exchange station having a table memory for storing information concerning a relation between the communication channel to each base station and ID numbers of each portable radio telephone terminal, thereby making connection of communication channels between the base stations in accordance with the calling request from an arbitrary one of said base stations; and a central data processing unit for processing data received from said exchange station, said central data processing unit being connected to said exchange station and having a central memory for storing data received from said exchange station and a central processor for processing said data, said central data processing unit being connected to said base stations through said exchange station when said exchange station receives data from an arbitrary one of said base stations;

wherein each of said radio telephones includes a radio communication circuit for transmitting and receiving voice and data signals between the radio telephone and said base station when said radio telephone is within the radio zone of the base station, a receive for transforming the voice signal from said radio communication circuit into an audible voice signal, a transmitter for transforming an audible voice signal from a user into a voice signal and transmitting said voice signal to said radio communication circuit, data input means for selecting a voice communication mode for transmitting and receiving the voice signal to and from said base station or a data communication mode for transmitting and receiving the data signal to and from said base station, and inputting data in said data communication mode by the user, data output means for displaying data signals while in said data communication mode to the user, an inner memory for storing a program, and a terminal processor which executes said program so that data inputted by said data input means is supplied in a format to said radio communication circuit and data from said radio communication circuit is supplied in a preselected format to the data output means, said portable radio telephone includes means for adding a flag to data inputted by said data input means, a first memory means for storing said flag-added data as first data, a second memory for temporarily storing data to be transmitted to said base station as second data, said terminal processor, during a predetermined period, reads said first data added with said flag from said first memory, stores it as said second data in said second memory, and eliminates the flag from said first data within said first memory after transmitted said second data to said base station.

2. A radio communication system comprising a plurality of portable radio telephones for making voice and data communication between the radio telephones within a service area formed by a plurality of radio zones, comprising:

a relay means for making a communication channel between the radio telephones, said relay means including a plurality of base stations placed in respective radio zones and an exchange station connected to each of said base stations, each of said base stations having a radio communication means for interchanging signals with the radio telephones contained within the respective radio zone of said base station, said radio communication means having means for receiving a calling request from a one of said radio telephones wherein the calling request includes an ID number of an other radio telephone of the plurality of radio telephones, said radio communication means having further means for transmitting said calling request to said exchange station, said exchange station having means for transmitting said calling request to a second base station, said second base station having means for receiving said calling request from said exchange station and having radio communication means to interchange radio signals with the other radio telephone having the ID number contained in said calling request when the other radio telephone is within a radio zone of said second base station and thereby establishes a communication channel on which a communication signal received from said exchange station is transmitted to the other radio telephone, said exchange station having a table memory for storing information concerning a relation between the communication channel to each base station and ID numbers of each portable radio telephone terminal, thereby making connection of communication channels between the base stations in accordance with the calling request from an arbitrary one of said base stations; and a central data processing unit for processing data received from said exchange station, said central data processing unit being connected to said exchange station and having a central memory for storing data received from said exchange station and a central processor for processing said data, said central data processing unit being connected to said base stations through said exchange station when said exchange station receives data from an arbitrary one of said base stations;

wherein each of said radio telephones includes a radio communication circuit for transmitting and receiving voice and data signals between the radio telephone and said base station when said radio telephone is within the radio zone of the base station, a receiver for transforming the voice signal from said radio communication circuit into an audible voice signal, a transmitter for transforming an audible voice signal from a user into a voice signal and transmitting said voice signal to said radio communication circuit, data input means for selecting a voice communication mode for transmitting and receiving the voice signal to and from said base station or a data communication mode for transmitting and receiving the data signal to and from said base station, and inputting data in said data communication mode by the user, data output means for displaying data signals while in said data communication mode to the user, an inner memory for storing a program, and a terminal processor which executes said program so that data inputted by said data input means is supplied in a format to said radio communication circuit and data from said radio communication circuit is supplied in a preselected format to the data output means, said central data processing unit causes said central memory to store said second data received through said relay means from said portable radio telephone, said central processor copies said second data and sends said copied data back through said relay means to said portable radio telephone, said terminal processor of said portable radio telephone compares said copied data and the second data of said second memory and transmits the result of said comparison to said central data processing unit through said relay means, said central data processing unit eliminates said second data from said central memory if the result of the comparison reaches disagreement.

3. A radio communication system comprising a plurality of portable radio telephones for making voice and data communication between the radio telephones within a service area formed by a plurality of radio zones, comprising:

a relay means for making a communication channel between the radio telephones, said relay means including a plurality of base stations placed in respective radio zones and an exchange station connected to each of said base stations, each of said base stations having a radio communication means for interchanging signals with the radio telephones contained within the respective radio zone of said base station, said radio communication means having means for receiving a calling request from a one of said radio telephones wherein the calling request includes an ID number of an other radio telephone of the plurality of radio telephones, said radio communication means having further means for transmitting said calling request to said exchange station, said exchange station having means for transmitting said calling request to a second base station, said second base station having means for receiving said calling request from said exchange station and having radio communication means to interchange radio signals with the other radio telephone having the ID number contained in said calling request when the other radio telephone is within a radio zone of said second base station and thereby establishes a communication channel on which a communication signal received from said exchange station is transmitted to the other radio telephone, said exchange station having a table memory for storing information concerning a relation between the communication channel to each base station and ID numbers of each portable radio telephone terminal, thereby making connection of communication channels between the base stations in accordance with the calling request from an arbitrary one of said base stations; and a central data processing unit for processing data received from said exchange station, said central data processing unit being connected to said exchange station and having a central memory for storing data received from said exchange station and a central processor for processing said data, said central data processing unit being connected to said base stations through said exchange station when said exchange station receives data from an arbitrary one of said base stations;

wherein each of said radio telephones includes a radio communication circuit for transmitting and receiving voice and data signals between the radio telephone and said base station when said radio telephone is within the radio zone of the base station, a receive for transforming the voice signal from said radio communication circuit into an audible voice signal, a transmitter for transforming an audible voice signal from a user into a voice signal and transmitting said voice signal to said radio communication circuit, data input means for selecting a voice communication mode for transmitting and receiving the voice signal to and from said base station or a data communication mode for transmitting and receiving the data signal to and from said base station, and inputting data in said data communication mode by the user, data output means for displaying data signals while in said data communication mode to the user, an inner memory for storing a program, and a terminal processor which executes said program so that data inputted by said data input means is supplied in a format to said radio communication circuit and data from said radio communication circuit is supplied in a preselected format to the data output means, said portable radio telephone when said result of the comparison reaches disagreement, eliminates said second data or again transmits said second data to said central data processing unit through said relay means.

4. A radio communication system comprising a plurality of portable radio telephones for making voice and data communication between the radio telephones within a service area formed by a plurality of radio zones, comprising:

a relay means for making a communication channel between the radio telephones, said relay means including a plurality of base stations placed in respective radio zones and an exchange station connected to each of said base stations, each of said base stations having a radio communication means for interchanging signals with the radio telephones contained within the respective radio zone of said base station, said radio communication means having means for receiving a calling request from a one of said radio telephones wherein the calling request includes an ID number of an other radio telephone of the plurality of radio telephones, said radio communication means having further means for transmitting said calling request to said exchange station, said exchange station having means for transmitting said calling request to a second base station, said second base station having means for receiving said calling request from said exchange station and having radio communication means to interchange radio signals with the other radio telephone having the ID number contained in said calling request when the other radio telephone is within a radio zone of said second base station and thereby establishes a communication channel on which a communication signal received from said exchange station is transmitted to the other radio telephone, said exchange station having a table memory for storing information concerning a relation between the communication channel to each base station and ID numbers of each portable radio telephone terminal, thereby making connection of communication channels between the base stations in accordance with the calling request from an arbitrary one of said base stations; and a central data processing unit for processing data received from said exchange station, said central data processing unit being connected to said exchange station and having a central memory for storing data received from said exchange station and a central processor for processing said data, said central data processing unit being connected to said base stations through said exchange station when said exchange station receives data from an arbitrary one of said base stations;

wherein each of said radio telephones includes a radio communication circuit for transmitting and receiving voice and data signals between the radio telephone and said base station when said radio telephone is within the radio zone of the base station, a receiver for transforming the voice signal from said radio communication circuit into an audible voice signal, a transmitter for transforming an audible voice signal from a user into a voice signal and transmitting said voice signal to said radio communication circuit, data input means for selecting a voice communication mode for transmitting and receiving the voice signal to and from said base station or a data communication mode for transmitting and receiving the data signal to and from said base station, and inputting data in said data communication mode by the user, data output means for displaying data signals while in said data communication mode to the user, an inner memory for storing a program, and a terminal processor which executes said program so that data inputted by said data input means is supplied in a format to said radio communication circuit and data from said radio communication circuit is supplied in a preselected format to the data output means, said portable radio telephone has a memory for storing data inputted by said data input means, said terminal processor causes the transmission of information including said data and the address of the information in said memory through said relay means to said central data processing unit, and said central data processing unit causes said central memory to store the data included in said information as first data, said central processor, during a predetermined time, causes the data stored in the memory of said portable radio to be retransmitted to said central processor through said relay means and stored as second data, said central processor compares said first data and said second data and updates said first data in said central memory in accordance with the result of the comparison.

5. A radio communication system comprising a plurality of portable radio telephones for making voice and data communication between the radio telephones within a service area formed by a plurality of radio zones, comprising:

a relay means for making a communication channel between the radio telephones, said relay means including a plurality of base stations placed in respective radio zones and an exchange station connected to each of said base stations, each of said base stations having a radio communication means for interchanging signals with the radio telephones contained within the respective radio zone of said base station, said radio communication means having means for receiving a calling request from a one of said radio telephones wherein the calling request includes an ID number of an other radio telephone of the plurality of radio telephones, said radio communication means having further means for transmitting said calling request to said exchange station, said exchange station having means for transmitting said calling request to a second base station, said second base station having means for receiving said calling request from said exchange station and having radio communication means to interchange radio signals with the other radio telephone having the ID number contained in said calling request when the other radio telephone is within a radio zone of said second base station and thereby establishes a communication channel on which a communication signal received from said exchange station is transmitted to the other radio telephone, said exchange station having a table memory for storing information concerning a relation between the communication channel to each base station and ID numbers of each portable radio telephone terminal, thereby making connection of communication channels between the base stations in accordance with the calling request from an arbitrary one of said base stations; and a central data processing unit for processing data received from said exchange station, said central data processing unit being connected to said exchange station and having a central memory for storing data received from said exchange station and a central processor for processing said data, said central data processing unit being connected to said base stations through said exchange station when said exchange station receives data from an arbitrary one of said base stations;

wherein each of said radio telephones includes a radio communication circuit for transmitting and receiving voice and data signals between the radio telephone and said base station when said radio telephone is within the radio zone of the base station, a receiver for transforming the voice signal from said radio communication circuit into an audible voice signal, a transmitter for transforming an audible voice signal from a user into a voice signal and transmitting said voice signal to said radio communication circuit, data input means for selecting a voice communication mode for transmitting and receiving the voice signal to and from said base station or a data communication mode for transmitting and receiving the data signal to and from said base station, and inputting data in said data communication mode by the user, data output means for displaying data signals while in said data communication mode to the user, an inner memory for storing a program, and a terminal processor which executes said program so that data inputted by said data input means is supplied in a format to said radio communication circuit and data from said radio communication circuit is supplied in a preselected format to the data output means, said portable radio telephone has a clock for producing the present time, a memory for storing the data inputted from said data input means, said terminal processor transmits information including said data, the address at which said data is stored in the memory and a time at which said data is produced through said relay means to said central data processing unit, said central processor of said central data processing unit causes said central memory to store the data included in said information as first data in association with said address and said data production time, said central processor, during a predetermined time, causes the data stored in the memory of said portable radio and a second production time to be retransmitted to said central processor through said relay means and to be stored as second data, said central processor compares the production time of said first data with that of said second data, and permits said central memory to store data with the newer production time.

6. A radio communication system comprising a plurality of portable radio telephones for making voice and data communication between the radio telephones within a service area formed by a plurality of radio zones, comprising:

a relay means for making a communication channel between the radio telephones, said relay means including a plurality of base stations placed in respective radio zones and an exchange station connected to each of said base stations, each of said base stations having a radio communication means for interchanging signals with the radio telephones contained within the respective radio zone of said base station, said radio communication means having means for receiving a calling request from a one of said radio telephones wherein the calling request includes an ID number of an other radio telephone of the plurality of radio telephones, said radio communication means having further means for transmitting said calling request to said exchange station, said exchange station having means for transmitting said calling request to a second base station, said second base station having means for receiving said calling request from said exchange station and having radio communication means to interchange radio signals with the other radio telephone having the ID number contained in said calling request when the other radio telephone is within a radio zone of said second base station and thereby establishes a communication channel on which a communication signal received from said exchange station is transmitted to the other radio telephone, said exchange station having a table memory for storing information concerning a relation between the communication channel to each base station and ID numbers of each portable radio telephone terminal, thereby making connection of communication channels between the base stations in accordance with the calling request from an arbitrary one of said base stations; and a central data processing unit for processing data received from said exchange station, said central data processing unit being connected to said exchange station and having a central memory for storing data received from said exchange station and a central processor for processing said data, said central data processing unit being connected to said base stations through said exchange station when said exchange station receives data from an arbitrary one of said base stations;

wherein each of said radio telephones includes a radio communication circuit for transmitting and receiving voice and data signals between the radio telephone and said base station when said radio telephone is within the radio zone of the base station, a receiver for transforming the voice signal from said radio communication circuit into an audible voice signal, a transmitter for transforming an audible voice signal from a user into a voice signal and transmitting said voice signal to said radio communication circuit, data input means for selecting a voice communication mode for transmitting and receiving the voice signal to and from said base station or a data communication mode for transmitting and receiving the data signal to and from said base station, and inputting data in said data communication mode by the user, data output means for displaying data signals while in said data communication mode to the user, an inner memory for storing a program, and a terminal processor which executes said program so that data inputted by said data input means is supplied in a format to said radio communication circuit and data from said radio communication circuit is supplied in a preselected format to the data output means, said portable radio telephone has a memory for storing the relation between an ID number of each base station and a location information, and sets said schedule information according to time data and location data, said terminal processor controls said ringing means to generate an alarm tone different from said ringing tone when the location information in said memory associated with said base station included in a control signal transmitted from the base station during each predetermined period is different from the location data included in said schedule information.

7. A portable radio telephone for a radio communication system for making voice communication or data communication between the portable radio telephone and an other portable radio telephone within a service area formed by a plurality of radio zones, said radio communication system comprising:

relay means for making a communication channel between the portable radio telephones, said relay means including a plurality of base stations placed in a respective one of said radio zones and an exchange station connected to each of said base stations, each of said base stations having radio communication means for interchanging signals with the portable radio telephones within the respective radio zone of said base station, said radio communication means having means for receiving a calling request from said portable radio telephone, said calling request including an ID number of the other portable radio telephone, said radio communication means having further means for transmitting said calling request to said exchange station, said exchange station having means for receiving and transmitting said calling request to a second base station, said second base station having means for receiving said calling request from said exchange station and means for interchanging radio signals with the other portable radio telephone having the ID number contained in said calling request when the portable radio telephone having the ID number is within the respective radio zone of said second base station, and thereby establishing a communication channel on which a communication signal received from the portable radio telephone is transmitted to said exchange station and on which a communication signal received from said exchange station is transmitted to the other portable radio telephone, said exchange station having a table memory for storing information concerning the relation between the communication channel to each base station and ID numbers of an each portable radio telephone terminal, thereby making connection of communication channels between the base stations in accordance with the calling request from an arbitrary base station; and a central data processing unit for processing data received from said exchange station, said central data processing unit being connected to said exchange station and having a central memory for storing data received from said exchange station and a central data processor for processing said data, said exchange station causing said base stations and said central processing unit to be connected through said exchange station when said exchange station receives a calling request from an arbitrary base station;

said portable radio telephone comprising a radio communication circuit for transmitting and receiving voice and data signals between the portable radio telephone and said base station when said portable radio telephone is within the respective radio zone of the base station;

a receiver for transforming the voice signal from said radio communication circuit into an audible voice signal;

a transmitter for transforming an audible voice signal from a user into a voice signal and transmitting said voice signal to said radio communication circuit;

data input means for selecting a voice communication mode for transmitting and receiving the voice signal to and from said base station or a data communication mode for transmitting and receiving the data signal, to and from said base station, and inputting data in said data communication mode by the user;

data output means for displaying data signals while in said data communication mode by the user;

an inner memory for storing a program; and a terminal processor which executes said program and which formats data signals exchanged between the input means and the radio communication circuit, wherein said portable radio telephone includes means for adding a flag to data inputted by said data input means, a first memory means for storing said flag-added data as first data, a second memory for temporarily storing data to be transmitted to said base station as second data, said terminal processor, during each predetermined period, reads said first data added with said flag from said first memory, stores it as said second data in said second memory, and eliminates the flag from said first data within said first memory after transmitting said second data to said base station.

8. A portable radio telephone for a radio communication system for making voice communication or data communication between the portable radio telephone and an other portable radio telephone within a service area formed by a plurality of radio zones, said radio communication system comprising:

relay means for making a communication channel between the portable radio telephones, said relay means including a plurality of base stations placed in a respective one of said radio zones and an exchange station connected to each of said base stations, each of said base stations having radio communication means for interchanging signals with the portable radio telephones within the respective radio zone of said base station, said radio communication means having means for receiving a calling request from said portable radio telephone, said calling request including an ID number of the other portable radio telephone, said radio communication means having further means for transmitting said calling request to said exchange station, said exchange station having means for receiving and transmitting said calling request to a second base station, said second base station having means for receiving said calling request from said exchange station and means for interchanging radio signals with the other portable radio telephone having the ID number contained in said calling request when the portable radio telephone having the ID number is within the respective radio zone of said second base station, and thereby establishing a communication channel on which a communication signal received from the portable radio telephone is transmitted to said exchange station and on which a communication signal received from said exchange station is transmitted to the other portable radio telephone, said exchange station having a table memory for storing information concerning the relation between the communication channel to each base station and ID numbers of an each portable radio telephone terminal, thereby making connection of communication channels between the base stations in accordance with the calling request from an arbitrary base station; and a central data processing unit for processing data received from said exchange station, said central data processing unit being connected to said exchange station and having a central memory for storing data received from said exchange station and a central processor for processing said data, said exchange station causing said base stations and said central data processing unit to be connected through said exchange station when said exchange station receives a calling request from an arbitrary base station;

said portable radio telephone comprising a radio communication circuit for transmitting and receiving voice and data signals between the portable radio telephone and said base station when said portable radio telephone is within the respective radio zone of the base station;

a receiver for transforming the voice signal from said radio communication circuit into an audible voice signal;

a transmitter for transforming an audible voice signal from a user into a voice signal and transmitting said voice signal to said radio communication circuit;

data input means for selecting a voice communication mode for transmitting and receiving the voice signal to and from said base station or a data communication mode for transmitting and receiving the data signal, to and from said base station, and inputting data in said data communication mode by the user;

data output means for displaying data signals while in said data communication mode by the user;

an inner memory for storing a program; and a terminal processor which executes said program and which formats data signals exchanged between the input means and the radio communication circuit, said central data processing unit causes said central memory to store said second data received through said relay means from said portable radio telephone, said central processor copies said second data and sends said copied data back through said relay means to said portable radio telephone, said terminal processor of said portable radio compares said copied data and the second data of said second memory and transmits the result of said comparison to said central data processing unit through said relay means, and said central processing unit eliminates said second data from said central memory if the result of the comparison reaches disagreement.

9. A portable radio telephone for a radio communication system for making voice communication or data communication between the portable radio telephone and an other portable radio telephone within a service area formed by a plurality of radio zones, said radio communication system comprising:

relay means for making a communication channel between the portable radio telephones, said relay means including a plurality of base stations placed in a respective one of said radio zones and an exchange station connected to each of said base stations, each of said base stations having radio communication means for interchanging signals with the portable radio telephones within the respective radio zone of said base station, said radio communication means having means for receiving a calling request from said portable radio telephone, said calling request including an ID number of the other portable radio telephone, said radio communication means having further means for transmitting said calling request to said exchange station, said exchange station having means for receiving and transmitting said calling request to a second base station, said second base station having means for receiving said calling request from said exchange station and means for interchanging radio signals with the other portable radio telephone having the ID number contained in said calling request when the portable radio telephone having the ID number is within the respective radio zone of said second base station, and thereby establishing a communication channel on which a communication signal received from the portable radio telephone is transmitted to said exchange station and on which a communication signal received from said exchange station is transmitted to the other portable radio telephone, said exchange station having a table memory for storing information concerning the relation between the communication channel to each base station and ID numbers of an each portable radio telephone terminal, thereby making connection of communication channels between the base stations in accordance with the calling request from an arbitrary base station; and a central data processing unit for processing data received from said exchange station, said central data processing unit being connected to said exchange station and having a central memory for storing data received from said exchange station and a central processor for processing said data, said exchange station causing said base stations and said central data processing unit to be connected through said exchange station when said exchange station receives a calling request from an arbitrary base station;

said portable radio telephone comprising a radio communication circuit for transmitting and receiving voice and data signals between the portable radio telephone and said base station when said portable radio telephone is within the respective radio zone of the base station;

a receiver for transforming the voice signal from said radio communication circuit into an audible voice signal;

a transmitter for transforming an audible voice signal from a user into a voice signal and transmitting said voice signal to said radio communication circuit;

data input means for selecting a voice communication mode for transmitting and receiving the voice signal to and from said base station or a data communication mode for transmitting and receiving the data signal, to and from said base station, and inputting data in said data communication mode by the user;

data output means for displaying data signals while in said data communication mode by the user;

an inner memory for storing a program; and a terminal processor which executes said program and which formats data signals exchanged between the input means and the radio communication circuit, wherein said portable radio telephone, when said result of said comparison reaches disagreement, eliminates said second data or again transmits said second data to said control data processing unit through said relay means.

10. A portable radio telephone for a radio communication system for making voice communication or data communication between the portable radio telephone and an other portable radio telephone within a service area formed by a plurality of radio zones, said radio communication system comprising:

relay means for making a communication channel between the portable radio telephone, said relay means including a plurality of base stations placed in a respective one of said radio zones and an exchange station connected to each of said base stations, each of said base stations having radio communication means for interchanging signals with the portable radio telephones within the respective radio zone of said base station, said radio communication means having means for receiving a calling request from said portable radio telephone, said calling request including an ID number of the other portable radio telephone, said radio communication means having further means for transmitting said calling request to said exchange station, said exchange station having means for receiving and transmitting said calling request to a second base station, said second base station having means for receiving said calling request from said exchange station and means for interchanging radio signals with the other portable radio telephone having the ID number contained in said calling request when the portable radio telephone having the ID number is within the respective radio zone of said second base station, and thereby establishing a communication channel on which a communication signal received from the portable radio telephone is transmitted to said exchange station and on which a communication signal received from said exchange station is transmitted to the other portable radio telephone, said exchange station having a table memory for storing information concerning the relation between the communication channel to each base station and ID numbers of an each portable radio telephone terminal, thereby making connection of communication channels between the base stations in accordance with the calling request from an arbitrary base station; and a central data processing unit for processing data received from said exchange station, said central data processing unit being connected to said exchange station and having a central memory for storing data received from said exchange station and a central processor for processing said data, said exchange station causing said base stations and said central data processing unit to be connected through said exchange station when said exchange station receives a calling request from an arbitrary base station;

said portable radio telephone comprising a radio communication circuit for transmitting and receiving voice and data signals between the portable radio telephone and said base station when said portable radio telephone is within the respective radio zone of the base station;

a receiver for transforming the voice signal from said radio communication circuit into an audible voice signal;

a transmitter for transforming an audible voice signal from a user into a voice signal and transmitting said voice signal to said radio communication circuit;

data input means for selecting a voice communication mode for transmitting and receiving the voice signal to and from said base station or a data communication mode for transmitting and receiving the data signal, to and from said base station, and inputting data in said data communication mode by the user;

data output means for displaying data signals while in said data communication mode by the user;

an inner memory for storing a program; and a terminal processor which executes said program and which formats data signals exchanged between the input means and the radio communication circuit, said central processor of said central data processing unit processes the data stored in said central memory in accordance with a request signal received through said relay means from said portable radio telephone in said data communication mode, and transmits through said relay means the result of said processing to the portable radio telephone specified by said request signal.

11. A portable radio telephone for a radio communication system for making voice communication or data communication between the portable radio telephone and an other portable radio telephone within a service area formed by a plurality of radio zones, said radio communication system comprising:

relay means for making a communication channel between the portable radio telephones, said relay means including a plurality of base stations placed in a respective one of said radio zones and an exchange station connected to each of said base stations, each of said base stations having radio communication means for interchanging signals with the portable radio telephones within the respective radio zone of said base station, said radio communication means having means for receiving a calling request from said portable radio telephone, said calling request including an ID number of the other portable radio telephone, said radio communication means having further means for transmitting said calling request to said exchange station, said exchange station having means for receiving and transmitting said calling request to a second base station, said second base station having means for receiving said calling request from said exchange station and means for interchanging radio signals with the other portable radio telephone having the ID number contained in said calling request when the portable radio telephone having the ID number is within the respective radio zone of said second base station, and thereby establishing a communication channel on which a communication signal received from the portable radio telephone is transmitted to said exchange station and on which a communication signal received from said exchange station is transmitted to the other portable radio telephone, said exchange station having a table memory for storing information concerning the relation between the communication channel to each base station and ID numbers of an each portable radio telephone terminal, thereby making connection of communication channels between the base stations in accordance with the calling request from an arbitrary base station; and a central data processing unit for processing data received from said exchange station, said central data processing unit being connected to said exchange station and having a central memory for storing data received from said exchange station and a central processor for processing said data, said exchange station causing said base stations and said central data processing unit to be connected through said exchange station when said exchange station receives a calling request from an arbitrary base station;

said portable radio telephone comprising a radio communication circuit for transmitting and receiving voice and data signals between the portable radio telephone and said base station when said portable radio telephone is within the respective radio zone of the base station;

a receiver for transforming the voice signal from said radio communication circuit into an audible voice signal;

a transmitter for transforming an audible voice signal from a user into a voice signal and transmitting said voice signal to said radio communication circuit;

data input means for selecting a voice communication mode for transmitting and receiving the voice signal to and from said base station or a data communication mode for transmitting and receiving the data signal, to and from said base station, and inputting data in said data communication mode by the user;

data output means for displaying data signals while in said data communication mode by the user;

an inner memory for storing a program; and a terminal processor which executes said program and which formats data signals exchanged between the input means and the radio communication circuit, said portable radio telephone has a memory for storing data inputted by said data input means, said terminal processor causes the transmission of information including said data and the address of the information in said memory through said relay means to said central data processing unit, and said central data processing unit causes said central memory to store the data included in said information as first data, said central processor, during a predetermined time, causes the data stored in the memory of said portable radio telephone to be retransmitted to said central processor through said relay means and stored as second data, said central processor compares said first data with said second data and updates said first date in said central memory in accordance with the result of the comparison.

12. A portable radio telephone for a radio communication system for making voice communication or data communication between the portable radio telephone and an other portable radio telephone within a service area formed by a plurality of radio zones, said radio communication system comprising:

relay means for making a communication channel between the portable radio telephones, said relay means including a plurality of base stations placed in a respective one of said radio zones and an exchange station connected to each of said base stations, each of said base stations having radio communication means for interchanging signals with the portable radio telephones within the respective radio zone of said base station, said radio communication means having means for receiving a calling request from said portable radio telephone, said calling request including an ID number of the other portable radio telephone, said radio communication means having further means for transmitting said calling request to said exchange station, said exchange station having means for receiving and transmitting said calling request to a second base station, said second base station having means for receiving said calling request from said exchange station and means for interchanging radio signals with the other portable radio telephone having the ID number contained in said calling request when the portable radio telephone having the ID number is within the respective radio zone of said second base station, and thereby establishing a communication channel on which a communication signal received from the portable radio telephone is transmitted to said exchange station and on which a communication signal received from said exchange station is transmitted to the other portable radio telephone, said exchange station having a table memory for storing information concerning the relation between the communication channel to each base station and ID numbers of an each portable radio telephone terminal, thereby making connection of communication channels between the base stations in accordance with the calling request from an arbitrary base station; and a central data processing unit for processing data received from said exchange station, said central data processing unit being connected to said exchange station and having a central memory for storing data received from said exchange station and a central processor for processing said data, said exchange station causing said base stations and said central data processing unit to be connected through said exchange station when said exchange station receives a calling request from an arbitrary base station;

said portable radio telephone comprising a radio communication circuit for transmitting and receiving voice and data signals between the portable radio telephone and said base station when said portable radio telephone is within the respective radio zone of the base station;

a receiver for transforming the voice signal from said radio communication circuit into an audible voice signal;

a transmitter for transforming an audible voice signal from a user into a voice signal and transmitting said voice signal to said radio communication circuit;

data input means for selecting a voice communication mode for transmitting and receiving the voice signal to and from said base station or a data communication mode for transmitting and receiving the data signal, to and from said base station, and inputting data in said data communication mode by the user;

data output means for displaying data signals while in said data communication mode by the user;

an inner memory for storing a program; and a terminal processor which executes said program and which formats data signals exchanged between the input means and the radio communication circuit, said portable radio telephone has a memory for storing data inputted by said data input means, said terminal processor causes the transmission of information including said data and the address of the information in said memory through said relay means to said central data processing unit, and said central data processing unit causes said central memory to store the data included in said information as first data in association with said address, said central processor, during a predetermined time, causes the data stored in the memory of said portable radio telephone to be retransmitted to said central processor through said relay means and stored as second data, said central processor compares said first data and said second data and updates said first data in said central memory in accordance with the result of the comparison.

13. A portable radio telephone for a radio communication system for making voice communication or data communication between the portable radio telephone and an other portable radio telephone within a service area formed by a plurality of radio zones, said radio communication system comprising:

relay means for making a communication channel between the portable radio telephones, said relay means including a plurality of base stations placed in a respective one of said radio zones and an exchange station connected to each of said base stations, each of said base stations having radio communication means for interchanging signals with the portable radio telephones within the respective radio zone of said base station, said radio communication means having means for receiving a calling request from said portable radio telephone, said calling request including an ID number of the other portable radio telephone, said radio communication means having further means for transmitting said calling request to said exchange station, said exchange station having means for receiving and transmitting said calling request to a second base station, said second base station having means for receiving said calling request from said exchange station and means for interchanging radio signals with the other portable radio telephone having the ID number contained in said calling request when the portable radio telephone having the ID number is within the respective radio zone of said second base station, and thereby establishing a communication channel on which a communication signal received from the portable radio telephone is transmitted to said exchange station and on which a communication signal received from said exchange station is transmitted to the other portable radio telephone, said exchange station having a table memory for storing information concerning the relation between the communication channel to each base station and ID numbers of an each portable radio telephone terminal, thereby making connection of communication channels between the base stations in accordance with the calling request from an arbitrary base station; and a central data processing unit for processing data received from said exchange station, said central data processing unit being connected to said exchange station and having a central memory for storing data received from said exchange station and a central processor for processing said data, said exchange station causing said base stations and said central data processing unit to be connected through said exchange station when said exchange station receives a calling request from an arbitrary base station;

said portable radio telephone comprising a radio communication circuit for transmitting and receiving voice and data signals between the portable radio telephone and said base station when said portable radio telephone is within the respective radio zone of the base station;

a receiver for transforming the voice signal from said radio communication circuit into an audible voice signal;

a transmitter for transforming an audible voice signal from a user into a voice signal and transmitting said voice signal to said radio communication circuit;

data input means for selecting a voice communication mode for transmitting and receiving the voice signal to and from said base station or a data communication mode for transmitting and receiving the data signal, to and from said base station, and inputting data in said data communication mode by the user;

data output means for displaying data signals while in said data communication mode by the user;

an inner memory for storing a program; and a terminal processor which executes said program and which formats data signals exchanged between the input means and the radio communication circuit, said portable radio telephone has a clock for producing the present time, and a memory for storing the data inputted from said data input means, said terminal processor transmits information including said data, the address at which said data is stored in the memory and a time at which said data is produced through said relay means to said central data processing unit, said central processor of said central data processing unit causes said central memory to store the data included in said information as first data in including said data production time, said central processor, during a predetermined time, causes the data stored in the memory of said portable radio telephone and a second production time to be retransmitted to said central processor through said relay means and to be stored as second data, said central processor compares the production time of said first data with that of said second data and permits said central memory to store data with the most recent production time.

14. A portable radio telephone for a radio communication system for making voice communication or data communication between the portable radio telephone and an other portable radio telephone within a service area formed by a plurality of radio zones, said radio communication system comprising:

relay means for making a communication channel between the portable radio telephones, said relay means including a plurality of base stations placed in a respective one of said radio zones and an exchange station connected to each of said base stations, each of said base stations having radio communication means for interchanging signals with the portable radio telephones within the respective radio zone of said base station, said radio communication means having means for receiving a calling request from said portable radio telephone, said calling request including an ID number of the other portable radio telephone, said radio communication means having further means for transmitting said calling request to said exchange station, said exchange station having means for receiving and transmitting said calling request to a second base station, said second base station having means for receiving said calling request from said exchange station and means for interchanging radio signals with the other portable radio telephone having the ID number contained in said calling request when the portable radio telephone having the ID number is within the respective radio zone of said second base station, and thereby establishing a communication channel on which a communication signal received from the portable radio telephone is transmitted to said exchange station and on which a communication signal received from said exchange station is transmitted to the other portable radio telephone, said exchange station having a table memory for storing information concerning the relation between the communication channel to each base station and ID numbers of an each portable radio telephone terminal, thereby making connection of communication channels between the base stations in accordance with the calling request from an arbitrary base station; and a central data processing unit for processing data received from said exchange station, said central data processing unit being connected to said exchange station and having a central memory for storing data received from said exchange station and a central processor for processing said data, said exchange station causing said base stations and said central data processing unit to be connected through said exchange station when said exchange station receives a calling request from an arbitrary base station;

said portable radio telephone comprising a radio communication circuit for transmitting and receiving voice and data signals between the portable radio telephone and said base station when said portable radio telephone is within the respective radio zone of the base station;

a receiver for transforming the voice signal from said radio communication circuit into an audible voice signal;

a transmitter for transforming an audible voice signal from a user into a voice signal and transmitting said voice signal to said radio communication circuit;

data input means for selecting a voice communication mode for transmitting and receiving the voice signal to and from said base station or a data communication mode for transmitting and receiving the data signal, to and from said base station, and inputting data in said data communication mode by the user;

data output means for displaying data signals while in said data communication mode by the user;

an inner memory for storing a program; and a terminal processor which executes said program and which formats data signals exchanged between the input means and the radio communication circuit, said portable radio telephone has a memory for storing the relation between an ID number of each base station and a location information and sets said schedule information according to time data and location data, said terminal processor controls said ringing means to generate an alarm tone different from said ringing tone when the location information in said memory associated with the address of said base station included in a control signal transmitted from the base station during each predetermined period is different from the location data included in said schedule information.

15. A communication system for making voice communication or data communication between first and second portable radio telephones within a service area formed by a plurality of radio zones, comprising:

a plurality of base stations respectively placed in said radio zones; and an exchange station connected to each of said base stations;

each of said base stations having radio communication means for interchanging signals with the portable radio telephones within the respective radio zone of said base station, said radio communication means having means for receiving a calling request from the first of said portable radio telephones, said calling request having an ID number of the second portable radio telephone, said radio communication means having further means for transmitting said calling request to said exchange station, said exchange station having means for receiving and transmitting said calling request to a second base station, said second base station having means for receiving said calling request from said exchange station and means for interchanging radio signals with the second portable radio telephone when the second portable radio telephone is within the respective radio zone of said second base station, and thereby establishing a communication channel on which a communication signal received from the first portable radio telephone is transmitted to said exchange station and on which a communication signal received from said exchange station is transmitted to the second portable radio telephone, said exchange station having a table memory for storing information concerning the relation between the communication channel to each base station and ID numbers of each portable radio telephone, thereby making connection of communication channels between the base stations in accordance with the calling request from an arbitrary one of said base stations;

wherein each of said portable radio telephones includes a radio communication circuit for transmitting and receiving voice and data signals between the portable radio telephone and said base station when said portable radio telephone is within the respective radio zone of the base station, a receiver for transforming the voice signal from said radio communication circuit into an audible voice signal, a transmitter for transforming an audible voice signal from a user into a voice signal and transmitting said voice signal to said radio communication circuit, data input means for inputting data, a schedule memory for storing schedule information inputted from said data input means, timer means for generating a present time and date, ringing means for generating a ringing tone for notifying a user of having received an incoming call signal from said base station, a terminal processor for controlling said ringing means in accordance with said schedule information and the present time and date generated from said timer means when having received an incoming call signal from the base station within the same radio zone, said portable radio telephone has a memory for storing the relation between an ID number of each base station and location information, said schedule information being set so that time data and location data have a correlation, said terminal processor controls said ringing means to generate an alarm sound different from said ringing tone when the location information of said memory, which information contains a correlation with the ID number of said base station, included in a control signal transmitted from the base station during each predetermined period is different from the location data included in said schedule information.

16. A radio communication system for making voice communication between first and second portable radio telephones within a service area formed by a plurality of radio zones, said radio communication system including a plurality of base stations respectively placed in said radio zones, and an exchange station connected to each of said base stations, each of said base stations having radio communication means for interchanging signals with the portable radio telephones when the radio telephones are within the respective radio zone of the base station, said radio communication means having means for receiving a calling request from the first portable radio telephone, said calling request including an ID number of the second portable radio telephone, said radio communication means having further means for transmitting said calling request to said exchange station, said exchange station having means for transmitting said calling request to a second base station, said second base station having means for receiving said calling request from said exchange station and having radio communication means to interchange radio signals with the second radio telephone when the second portable radio telephone is within the respective radio zone of said second base station, and thereby sets a free communication channel on which a communication signal received from the portable radio telephone is transmitted to said exchange station and on which a communication signal received from said exchange station is transmitted to the second portable radio telephone, said exchange station having a table memory for storing information concerning the relation between the channel to each base station and the ID number of each portable radio terminal, thereby making connection of communication channels between the base stations in accordance with the calling request from an arbitrary one of said base stations, each said portable radio telephone comprising:

a radio communication circuit for transmitting and receiving a voice signal on a radio wave from and to the base station when the portable radio telephone is within the respective radio zone of the base station;

a receiver for emanating sound of the voice signal from said radio communication circuit;

a transmitter for converting voice from the user into the voice signal which is transmitted to said radio communication circuit;

data input means for inputting data;

a schedule memory for storing schedule information inputted through said data input means;

timer means for generating the present time and date;

ringing means for generating a ringing tone by which the user is notified of having received an incoming call signal from the base station; and a terminal processor for controlling said ringing means in accordance with said schedule information and the present time and date generated from said timer means when having received the incoming call signal from the base station which is located in the radio zone in which said portable radio telephone is located, said portable radio telephone has a memory for recording the relation between the ID number of each base station and location information, and sets said schedule information so that at least the time data and the location data re associated with each other, and said terminal processor controls said ringing means to generate alarm sound different from said ringing tone when the location information of said memory which is associated with the ID number of said base station and included in the control signal transmitted from the base station during each certain period is different from the location data included in said schedule information.

* * * * *

UNITED STATES PATENT AND TRADEMARK OFFICE
CERTIFICATE OF CORRECTION

PATENT NO. : 5,128,981
DATED : July 7, 1992
INVENTOR(S) : Nobuo Tsukamoto, et al.

It is certified that error appears in the above-identified patent and that said Letters Patent is hereby corrected as shown below:

Claim 1, column 22, line 35, delete "receive" and replace with --receiver--.

Claim 3, column 25, line 8, delete "receive" and replace with --receiver--.

Claim 10, column 33, line 42, delete "telephone" and replace with --telephones--.

Claim 11, column 36, line 13, delete "date" and replace with --data--.

Claim 13, column 38, line 67, delete "in".

Claim 16, column 42, line 50, delete "re" and replace with --are--.

Signed and Sealed this

Twenty-fourth Day of August, 1993

Attest:

BRUCE LEHMAN

*Attesting Officer*　　*Commissioner of Patents and Trademarks*